United States Patent
Smith et al.

(10) Patent No.: US 8,316,616 B2
(45) Date of Patent: Nov. 27, 2012

(54) METHODS AND DEVICES FOR CONSTRUCTING A WALL WITH BRICK FACADE

(75) Inventors: Steven George Smith, St. Michael, MN (US); Troy Achterkirch, Rogers, MN (US); Steven John Thorkelson, Minnetonka, MN (US)

(73) Assignee: VAST Enterprises, LLC, Minneapolis, MN (US)

( * ) Notice: Subject to any disclaimer, the term of this patent is extended or adjusted under 35 U.S.C. 154(b) by 746 days.

(21) Appl. No.: 12/397,988

(22) Filed: Mar. 4, 2009

(65) Prior Publication Data

US 2010/0223869 A1 Sep. 9, 2010

(51) Int. Cl.
*E04G 11/06* (2006.01)
*E04G 21/22* (2006.01)
*E04G 13/00* (2006.01)
*E04G 9/10* (2006.01)

(52) U.S. Cl. .......... 52/745.19; 52/747.1; 52/747.12; 52/311.3; 52/315; 52/384; 52/387; 52/389; 249/15; 249/96; 249/189

(58) Field of Classification Search ............ 52/314–316, 52/311.3, 746.1, 745.19, 745.2, 747.1, 746.12, 52/745.05, 745.11, 745.1, 127.3, 384–392, 52/749.13; 428/44, 49, 68, 703, 195; 249/96–97, 249/61, 83, 15–16, 91, 33, 47, 192, 196, 249/189; 264/220
See application file for complete search history.

(56) References Cited

U.S. PATENT DOCUMENTS

| | | | | |
|---|---|---|---|---|
| 2,613,423 A | * | 10/1952 | Davis | 425/110 |
| 4,858,410 A | * | 8/1989 | Goldman | 52/591.5 |
| 4,932,182 A | * | 6/1990 | Thomasson | 52/318 |
| 5,098,059 A | * | 3/1992 | Sawyer | 249/16 |
| 5,268,137 A | * | 12/1993 | Scott et al. | 264/225 |
| 5,900,180 A | * | 5/1999 | Scott et al. | 249/61 |
| 6,041,567 A | * | 3/2000 | Passeno | 52/749.11 |
| 6,237,294 B1 | * | 5/2001 | Rygiel | 52/314 |
| 8,042,309 B2 | * | 10/2011 | Wolf et al. | 52/314 |
| 2002/0100241 A1 | * | 8/2002 | Rygiel | 52/561 |

FOREIGN PATENT DOCUMENTS

| | | |
|---|---|---|
| GB | 1089846 | 11/1967 |
| WO | WO-1089846 | 3/1914 |
| WO | WO-5268137 | 12/1993 |
| WO | WO-020174622 A1 | 11/2002 |
| WO | WO-2010102141 A1 | 9/2010 |

OTHER PUBLICATIONS

"International Application U.S. Appl. No. PCT/US2010/026258, Search Report and Written Opinion mailed Apr. 30, 2010", 17 pgs.
"International Application U.S. Appl. No. PCT/US2010/026258, International Preliminary Report on Patentability mailed Sep. 15, 2011", 12 pgs.

* cited by examiner

*Primary Examiner* — Jeanette E. Chapman
(74) *Attorney, Agent, or Firm* — Schwegman Lundberg Woessner P.A.

(57) ABSTRACT

A method for forming a brick façade positioning assembly includes positioning a plurality of bricks in a specified wall pattern. A film is placed over the bricks, and the film is molded over the bricks to form a custom brick film tray. The custom brick film tray includes brick shaped tray recesses in the specified wall pattern. The plurality of bricks are positioned within the brick shaped tray recesses. Optionally, a liquid setting material is poured on the custom brick film tray and the plurality of bricks to form a brick façade wall. The brick façade wall includes the bricks in the specified wall pattern provided by the custom brick film tray.

38 Claims, 19 Drawing Sheets

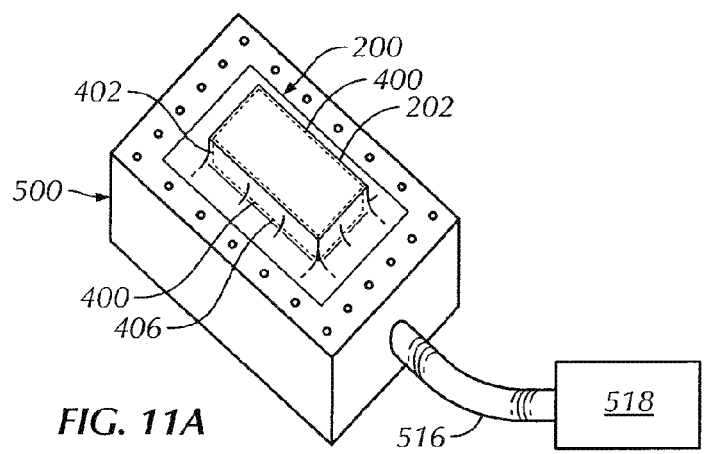
*FIG. 11A*
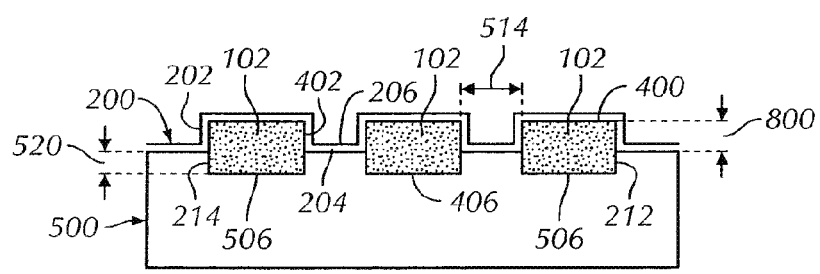
*FIG. 11B*
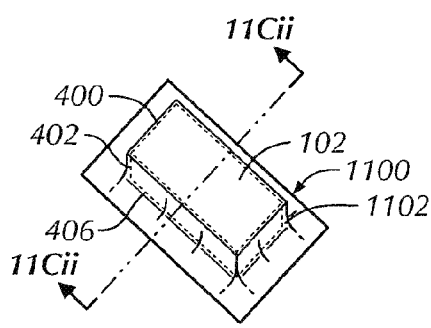
*FIG. 11Ci*
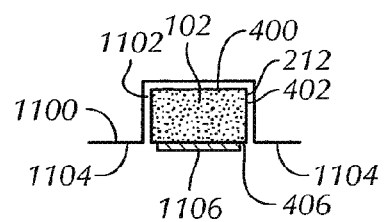
*FIG. 11Cii*

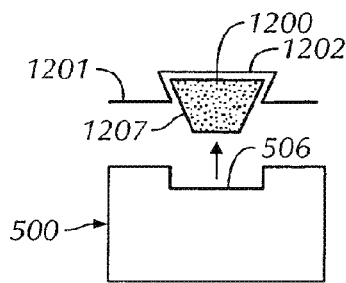
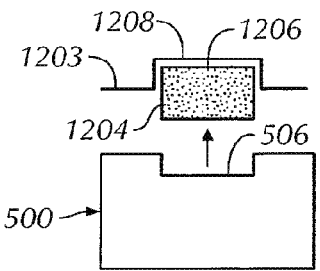
*FIG. 12A*  *FIG. 12B*
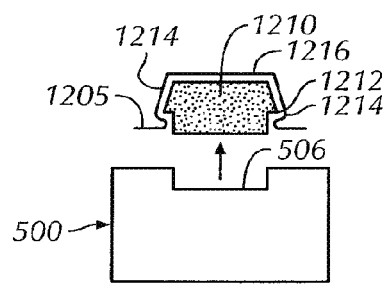
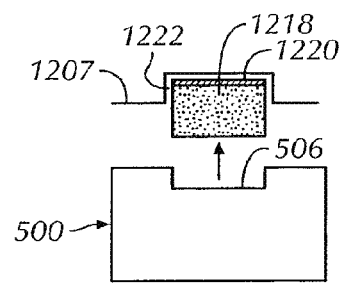
*FIG. 12C*  *FIG. 12D*
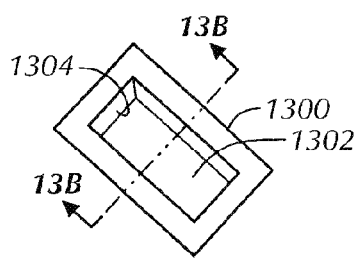
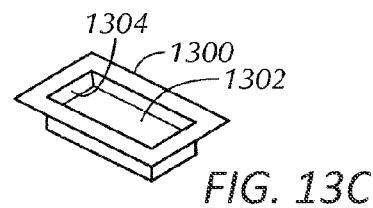
*FIG. 13A*  *FIG. 13C*
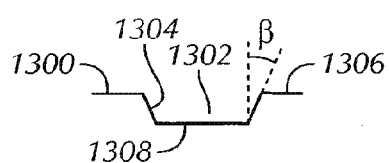
*FIG. 13B*

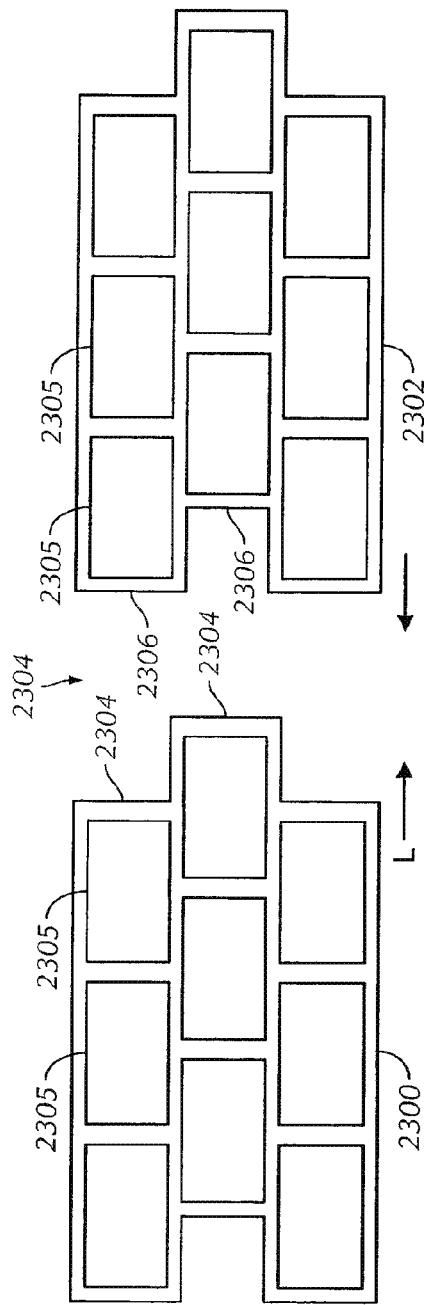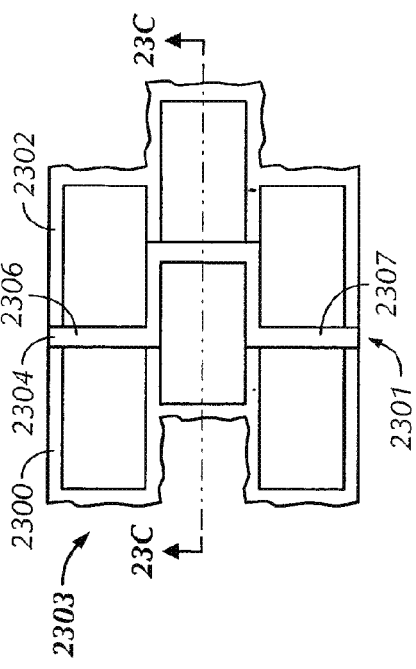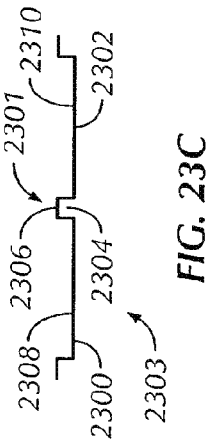
FIG. 23A
FIG. 23B
FIG. 23C

METHODS AND DEVICES FOR CONSTRUCTING A WALL WITH BRICK FACADE

TECHNICAL FIELD

Wall fabrication and decorative brick facades.

BACKGROUND

Preformed walls with decorative brick façades are used in commercial and residential construction. In some commercial applications a concrete wall is poured on or off site and the decorative bricks are laid adjacent to the wall to provide a decorative appearance. In some residential applications a decorative brick fascia is attached to an existing wall surface (e.g., concrete or wood framing). In both instances, it is a labor and time intensive process to first construct the wall and then apply the decorative fascia. In the case of laying bricks along a concrete or wood framed wall a skilled mason is needed to properly lay, level and mortar the bricks to provide a consistent appealing façade.

In another example, pallets of bricks are brought to a work site where concrete walls are constructed. The bricks are unloaded from the pallets and individually placed by laborers within durable rubber mats. The bricks are positioned within the rubber mats and let partially exposed. Concrete is then poured over the bricks and the rubber mats to form a concrete wall with the decorative bricks contained therein. After the wall is rotated into a substantially vertical position, laborers pry the rubber mat off of the concrete wall and the bricks remain retained in the wall. The rubber mats are often destroyed in the process as the concrete and bricks adhere the mats to the wall and additional cost is incurred to replace the rubber mats for additional wall construction. This adhesion happens in part because the liquid concrete bleeds by the joints between the rubber mat and the sides of the bricks. The bled concrete subsequently hardens and forms an anchor that holds the mat to the wall. To address this problem the mats and/or bricks are repeatedly coated with non-stick materials (lubricants, waxes and the like) to minimize such adhesion. The process for forming these walls is labor intensive because each brick is individually positioned within the rubber mat, and to lessen destruction of the rubber mat the mat and/or bricks must be treated with materials to minimize adhesion between the wall and the mat. The remnants of these treating materials must then be scrubbed or washed off of the completed wall. Alternatively, more time is needed during removal of the mat from the wall to physically pry the mat from the wall. Further work is needed to remove any concrete that has bled over the bricks during the pouring process, for instance by brushing, power washing and the like.

Because of these issues the present methods for forming decorative brick façade walls are expensive and labor intensive.

BRIEF DESCRIPTION OF THE DRAWINGS

FIG. 11A is an isometric view of the film formed into one example of a custom brick film tray over at least one brick, the custom brick film tray includes at least one brick shaped tray recess receiving a decorative brick surface of the at least one brick.

FIG. 11B is a cross sectional view of another example of a custom brick film tray vacuum formed over a plurality of bricks on a vacuum forming plate.

FIG. 11Ci is an isometric view of another example of the custom brick film tray vacuum formed over the plurality of bricks after removal from the planar vacuum forming plate shown in FIG. 9A.

FIG. 11Cii is a cross sectional view of the custom brick film tray of FIG. 9A taken along line 11Ci-11Ci.

FIG. 12A is a cross sectional view of one example of a retaining feature of a brick façade positioning assembly including a negative draft configured to retain a brick within the custom brick film tray during removal of the tray from a vacuum forming plate.

FIG. 12B is a cross sectional view of one example of a retaining feature of a brick façade positioning assembly including a friction feature configured to retain a brick within the custom brick film tray during removal of the tray from a vacuum forming plate.

FIG. 12C is a cross sectional view of one example of a retaining feature of a brick façade positioning assembly including a brick having at least one barbed feature received within at least one barbed recess of the custom brick film tray to retain the brick in the tray during removal of the tray from a vacuum forming plate.

FIG. 12D is a cross sectional view of one example of a retaining feature of a brick façade positioning assembly including an adhesive configured to retain a brick within the custom brick film tray during removal of the tray from a vacuum forming plate.

FIG. 13A is a detailed isometric view of a portion of a custom brick film tray showing one example of a brick film tray recess having a positive draft angle configured to assist in peeling of the custom brick film tray from a brick façade wall.

FIG. 13B is a cross sectional view taken along line 13A-13A of the portion of the custom brick film tray shown in FIG. 13A having the positive draft angle.

FIG. 13C is detailed side isometric view of the portion of the custom brick film tray shown in FIG. 13A having the positive draft angle.

FIG. 23A is a top view of two custom brick film trays with coupling features configured to align the plurality of bricks of each tray.

FIG. 23B is a top view of the two custom brick film trays coupled together with the coupling features.

FIG. 23C is a detailed cross sectional view of two custom brick film trays at the joint between the two trays.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
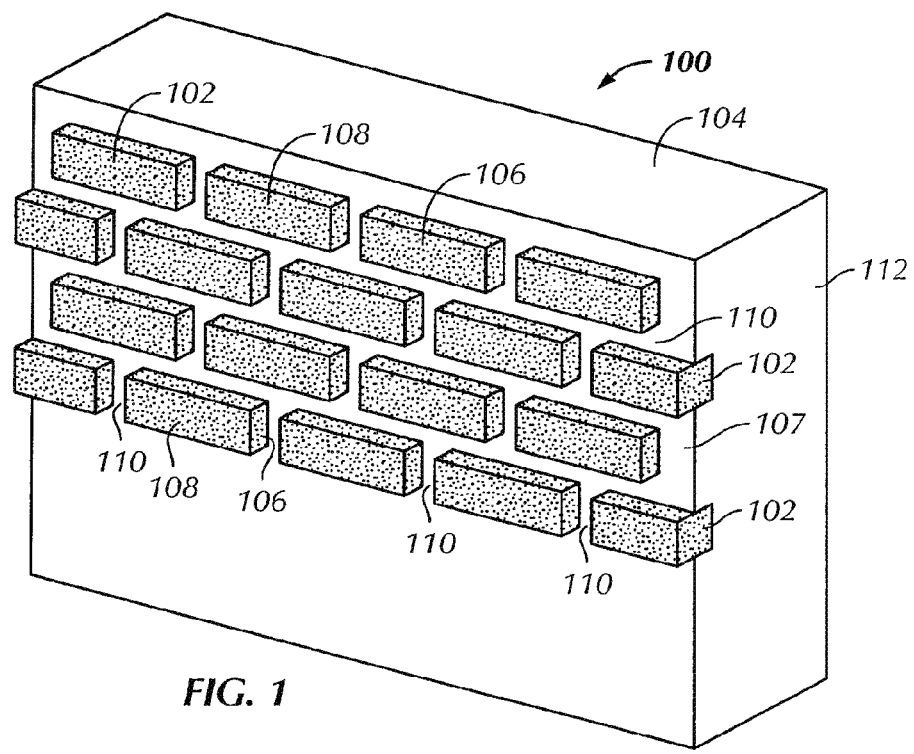
FIG. 1 is an isometric view of a brick façade wall.

FIG. 1 shows one example of a brick facade wall 100. The brick façade wall 100 includes a plurality of bricks 102 held within a base material 104. In one example, the base material 104 includes, but is not limited to concrete, resins and the like (e.g., materials that can be poured around the bricks 102 to form the brick façade wall 100). As shown in FIG. 1, the bricks 102 present a raised profile service 108. The bricks 102 including the raised profile surface 108 provides a decorative appearance to the brick façade wall 100. In one example, the raised profile surface 108 is constructed with the bricks 102 including composite bricks constructed with but not limited to polymers, recycled materials and the like including recycled polymers. The raised profile surface 108 is offset from a base surface 107 by profile height 106. The raised profile surface 108 and profile height 106 cooperate to give the appearance of a finished brick wall constructed with contemporary bricks and mortar. Grout lines 110 extend between the bricks 102 to further provide a decorative appearance to the brick façade of the wall 100. Referring to side surface 112 of the brick façade wall 100, the bricks 102 are shown embedded within the wall 100. As will be described in further detail below, the bricks 102 are inset into the wall 100 during a pouring process such as the pouring of concrete around the bricks 102 to form the brick façade wall 100.

Figure 2:
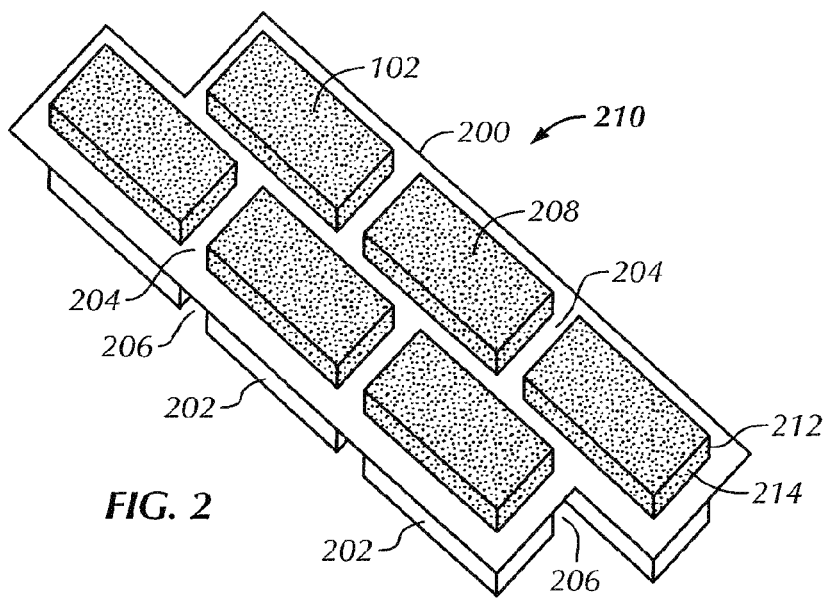
FIG. 2 is an isometric view of one example of a brick façade positioning assembly including a custom brick film tray having a plurality of bricks disposed therein.

Referring now to FIG. 2, one example of a custom brick film tray 200 is shown and will be described in further detail below. The custom brick film tray 200 includes a composite polymer molded over the bricks 102 to maintain the bricks 102 in a specified wall pattern 210 such as the wall pattern shown in FIG. 2. The custom brick film tray 200 retains the bricks 102 in brick shaped tray recesses 202 within the tray 200. As shown in the example in FIG. 2, the bricks 102 are partially retained within the brick shaped tray recesses 202 allowing a rear surface 208 of the bricks 102 to extend out of the custom brick film tray 200. The side portions 212 of the bricks 102 are partially disposed within the brick shaped tray recesses 202. A remainder portion 214 of the bricks 102 extends above grout ridges 204 within the custom brick film tray 200. The rear brick surfaces 208 and remainder surfaces 214 of the sides 212 of the bricks 102 are exposed and are received within liquid setting materials such as concrete, composites such as resins and the like during pouring over the custom brick film tray 200 to form a brick façade wall (e.g., brick façade wall 100 as shown in FIG. 1).

The grout ridges 204 shown in FIG. 2 define an upper surface of the custom brick film tray 200. The grout ridges 204 space the bricks 102 apart and allow for the infiltration of liquid setting materials between the bricks 102 to form the brick façade wall 100. As will be described in further detail below, the grout ridges 204 are formed during a tray molding process where a polymer film is molded around the bricks 102 when the bricks are arranged in a specified wall pattern such as the specified wall pattern 210 shown in FIG. 2. Corresponding grout recesses 206 are disposed beneath each of the grout ridges 204. The grout recesses 206 are created during the forming process of the custom brick film tray 200.

Figure 3:
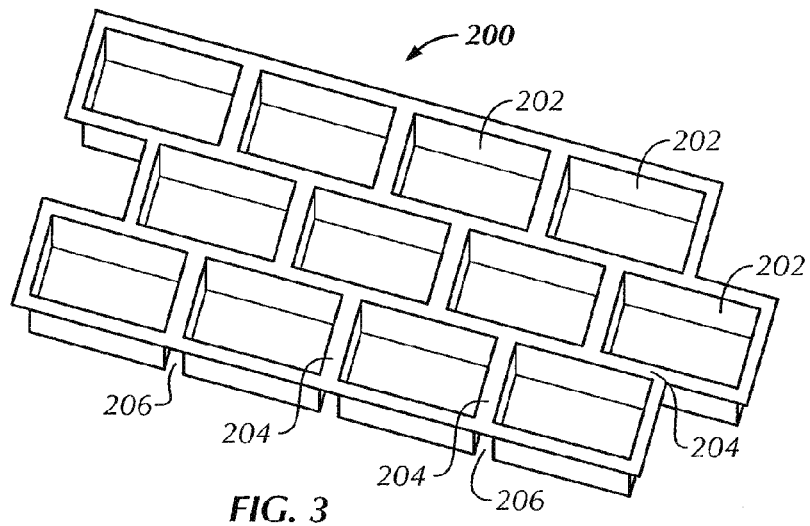
FIG. 3 is an isometric view of the custom brick film tray of FIG. 2 with the plurality of bricks removed.

Referring now to FIG. 3, the custom brick film tray 200 is shown with the plurality of bricks 102 shown in FIG. 2 removed. The brick shaped tray recesses 202 are formed in the custom brick film tray in the specified wall pattern such as the wall pattern 210 shown in FIG. 2 and mirrored in the brick shaped tray recesses 202 shown in FIG. 3. Because the custom brick film tray 200 is formed with a molded film the custom brick film tray 200 can be formed with one of or a number of specified wall patterns determined by the arrangement of the bricks 102 prior to molding. Patterns include but are not limited to stretch or bond, English bond, quarter bond, header bond, Spanish bond, Flemish bond, garden wall bond, rat trap bond, herringbone bond, basket bond and the like. The custom brick film tray 200 is molded over the bricks 102 to provide brick shaped tray recesses 202 (with the bricks therein) in whatever decorative wall pattern is desired by the end user. As will be described further below, the bricks 102 are arranged in the desired wall pattern and the custom brick film tray 200 is formed around the bricks while in this pattern. The custom brick film tray 200 thereafter maintains the bricks 102 within the specified wall pattern for storage, transport, and pouring operations during construction of the brick façade wall.

Referring again to the brick shaped tray recesses 202, the brick shaped tray recesses 202 are sized and shaped, in one example, to allow the bricks 102 including the brick rear surfaces 208 and remainder surfaces 214 of the sides 212 (see FIG. 2) to extend out of the custom brick film tray 200 thereby allowing for infiltration of liquid setting material between the bricks 102 and setting of the bricks 102 during hardening of the liquid setting material as will be described in further detail below. In another example, the bricks 102 are fully retained within the brick shaped tray recesses 202 and only the rear brick surface 208 shown in FIG. 2 is exposed. The depth of the brick shaped tray recesses 202 correspondingly determines how much if any of the sides 212 of the bricks 102 are exposed. Similarly, the depth of the brick shaped tray recesses 202 determines how much of the bricks 102 extend out of the base material 104 of the brick façade wall 100 (e.g., the height of the profile created by the bricks 102 within the brick façade wall 100). That is to say the deeper the brick shaped tray recess 202 the more the brick 102 will be presented extending out of the wall 100.

Additionally, the bricks 102 are arranged in a specified wall pattern according to a desired offset or spacing from adjacent bricks. Bricks 102 are positioned relative to each other with a desired spacing therebetween, and when the custom brick film tray 200 is formed as the film is molded around the bricks 102 the grout ridges 204 are formed with corresponding spacing. The custom brick film tray 200 is thereby able to maintain a desired spacing between the bricks 102 according to the dimensions of the molded grout ridges 204.

Figure 4A:
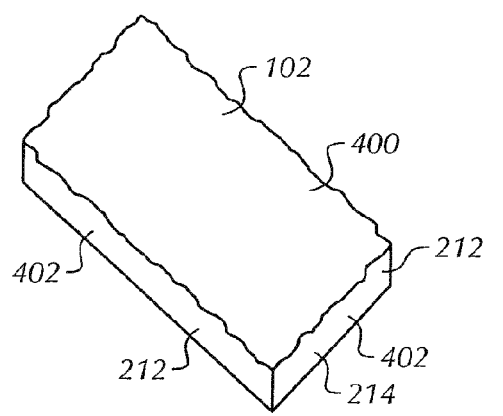
FIG. 4A is a top isometric view of one example of a brick for use with the custom brick film tray and positioned in the brick façade wall
Figure 4B:
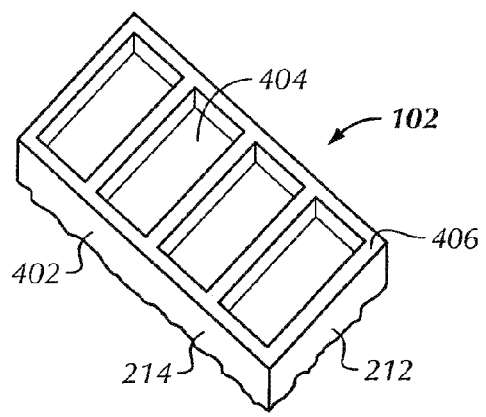
FIG. 4B is a bottom isometric view of the brick shown in FIG. 4A.

One example of a decorative brick 102 is shown in FIGS. 4A, 4B. The brick 102 includes a decorative or aesthetic face 400. In one example, the decorative face 400 provides a desired texture to the brick 102 thereby providing the brick façade wall 100 shown in FIG. 1 with a corresponding brick texture. As shown in FIGS. 4A and 4B, the brick 102 includes sides 212 having side portions 402. Side portions 402 are concealed at least in part within the brick shaped tray recesses 202 as shown in FIG. 3. Referring to FIG. 4B, the remainder 214 of the side portions are exposed, in one example, out of the custom brick film tray 200 as shown in FIG. 2. The brick 102 shown in FIG. 4B includes recess pockets 404. Recess pockets 404 are included, in one option, to minimize the weight of the bricks 102 thereby allowing the custom brick film tray 200 to more easily carry the weight of the bricks 102 arranged therein. In another option, the recess pockets 404 allow for greater infiltration of a liquid setting material (e.g., concrete) into the brick 102 thereby further anchoring the brick 102 within the brick façade wall 100 (see FIG. 1). As previously described, in one example, the bricks 102 are constructed with composite recycled materials. In another example, the bricks 102 include, but are not limited to, clay, resins, wood, metals and the like. In yet another example, referring again to FIG. 4A, the decorative surface 400 of the brick 102 includes a decorative pattern such as embossing, insetting and the like.

In another example, at least the decorative surfaces 400 and sides 212 of the bricks include contoured surfaces. Contoured surfaces provide a unique non-identical surface to each of the bricks 102 found in the brick façade wall 100 shown in FIG. 1. In one option, the contoured surfaces are formed in the bricks during a brick manufacturing process, and the contoured surfaces make each brick 102 unique relative to other bricks. As will be described in further detail below, the custom brick film tray 200 is molded around these unique contoured surfaces of the bricks 102 to provide custom brick shaped tray recesses that tightly seal around at least the sides 212 of the bricks 102.

Figure 5A:
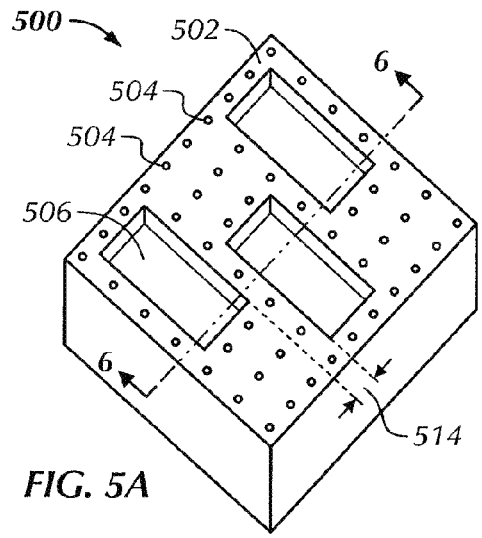
FIG. 5A is an isometric view of one example of a vacuum forming plate including brick shaped recesses.

One example of a vacuum forming table 500 to form a custom brick film tray, such as custom brick film tray 200 shown in FIG. 3, is shown in FIG. 5A. The vacuum forming table 500 includes a vacuum plate surface 502 having vacuum holes 504 positioned around the vacuum plate surface. Gas is drawn through the vacuum holes 504 to draw a polymer film over bricks disposed on the vacuum plate surface 502 thereby forming the custom brick film tray 200. As shown in FIG. 5A, the vacuum forming plate 500 includes brick shaped plate recesses 506. Prior to forming the custom brick film tray 200 (shown in FIG. 3) the bricks 102 are positioned within the brick shaped plate recesses 506. The polymer film is formed around the bricks 102 within the brick shaped plate recesses 506 to form the custom brick film tray 200.

Figure 5B:
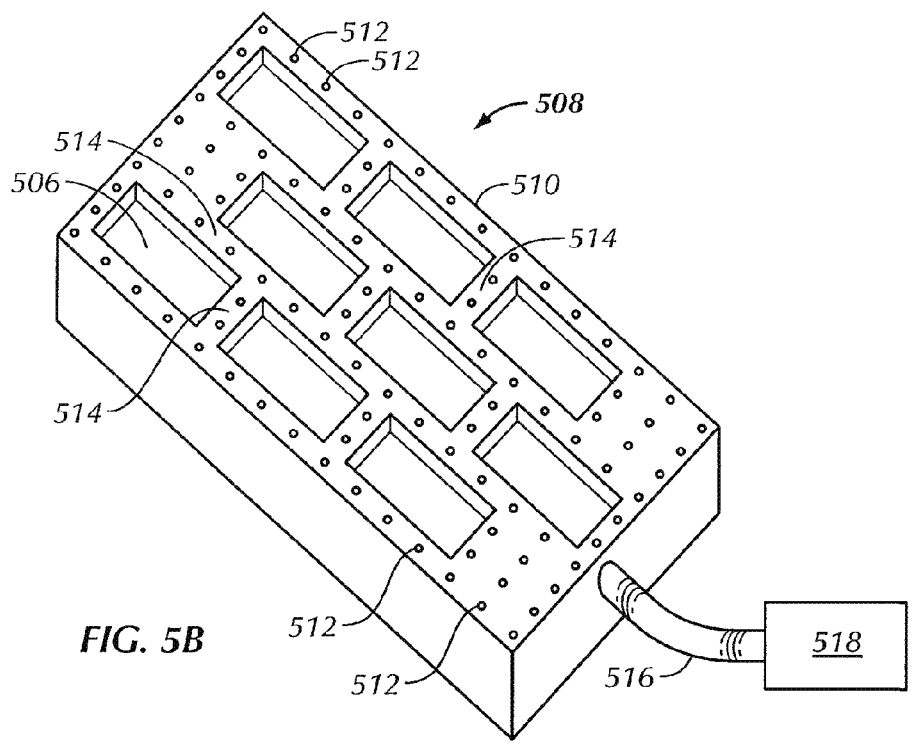
FIG. 5B is an isometric view of another example of a vacuum forming plate including brick shaped recesses.

Another example of a vacuum forming plate 508 is shown in FIG. 5B. In the vacuum forming plate 508 additional brick shaped plate recesses 506 are included. In yet another example, a vacuum forming plate includes a plurality of brick shaped plate recesses 506 greater than or less than the number of brick shaped recesses shown in FIGS. 5A and 5B. The brick shaped plate recesses 506 are arranged on the vacuum plate surface 502, 510 in the specified wall pattern desired for the custom brick film tray 200 and brick façade wall. Referring to FIG. 5B, the brick shaped plate recesses 506 are arranged on the vacuum plate surface 510 offset from each other according to spaces 514. Spaces 514 correspond to the grout ridges 204 shown in FIG. 3 of the custom brick film tray 200. That is to say the spaces 514 between the brick shaped plate recesses 506 correspondingly define the grout ridges 204 in the custom brick film tray 200 as the polymer film is vacuumed over the plurality of bricks 102 positioned within the brick shaped plate recesses 506 of the vacuum forming plate 510. As shown in FIG. 5B, the vacuum forming plate 510, like the vacuum forming plate 500, includes vacuum holes 512. Gas is drawn through the vacuum holes 512 through a vacuum hose 516 coupled with a vacuum pump 518. The vacuum pump 518 provides sufficient suction through the vacuum hose 516 to mold the polymer film tightly around the plurality of bricks 102 on the vacuum plate surface 510 to form the custom brick film tray 200. To put it another way, the vacuum pump 518 provides sufficient suction through the vacuum holes 512 to mold the polymer film around the plurality of bricks 102 arranged in the specified wall pattern thereby forming the custom brick film tray 200 shown in FIGS. 2 and 3.

Figure 6:
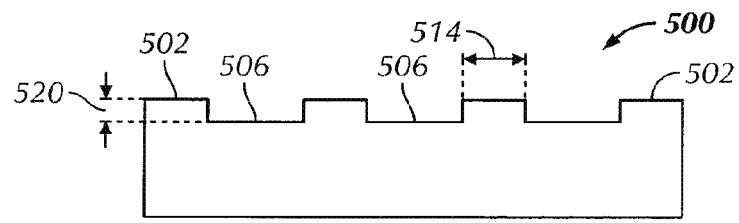
FIG. 6 is a cross sectional view taken along line 5A-5A of the vacuum forming plate shown in FIG. 5A.

Referring now to FIG. 6, the vacuum forming plate 500 shown in FIG. 5A is shown in cross section taken along 5A-5A. As shown in FIG. 6, the brick shaped plate recesses 506 are recessed from the vacuum plate surface 502 a recess distance 520. When the plurality of bricks 102 are positioned within the brick shaped plate recesses 506 the bricks correspondingly extend out of the brick shaped plate recesses 506 beyond the vacuum plate surface 502. The brick extend out of the vacuum plate surface 502 an inverse distance to the recess distance 520 of the brick shaped plate recesses 506. In other words, the greater the recess distance 520 of the brick shaped plate recesses 506 less of the plurality of bricks 102 extends beyond the vacuum plate surface 502. The offset spacing 514 shown in FIGS. 5A and 5B is also shown in FIG. 6. As previously described, the plurality of bricks 102 are positioned within the brick shaped plate recesses 506 and offset from each other according to the offset spacing 514 between the brick shaped plate recesses. The specified wall pattern on the vacuum forming plates 500 and 510 is configured according to a desired wall pattern in a brick façade wall, such as the brick façade wall 100 shown in FIG. 1. In other examples where the brick façade wall is desired to have a different appearance the brick shaped plate recesses 506 are arranged in a corresponding pattern on the vacuum forming plates. The vacuum plate surfaces 502, 510 have the brick shaped plate recesses 506 arranged in such a specified wall pattern with the offset spacing 514 and recess distance 520 adjusted according to the desired appearance of the specified wall pattern.

In one option, a single vacuum forming plate such as vacuum forming plates 500, 508 are configured to receive a variety of vacuum plate surfaces including vacuum plate surfaces 502, 510 and vacuum plate surfaces having different configurations of brick shaped plate recesses 506 in a variety of specified wall patterns according to the particular desires of the end users. In yet another option, the custom brick film tray 200 is formed without positioning the plurality of bricks 102 within brick shaped plate recesses 506 of the vacuum forming plates 500, 508. For example, a polymer film is positioned over the vacuum plate surfaces 502, 510 without the bricks 102 therein. The vacuum pump 518 draws gasses through the vacuum holes 512 to draw the polymer film into the brick shaped plate recesses 506 (the brick shaped recesses 506 in this example include vacuum holes 512 disposed therein) to form the custom brick film tray. The polymer film thereby assumes the configuration of the brick shaped plate recesses 506 as opposed to the specific contours of the plurality of bricks 102 positioned within the brick shaped plate recesses 506 as described in other examples.

Figure 7:
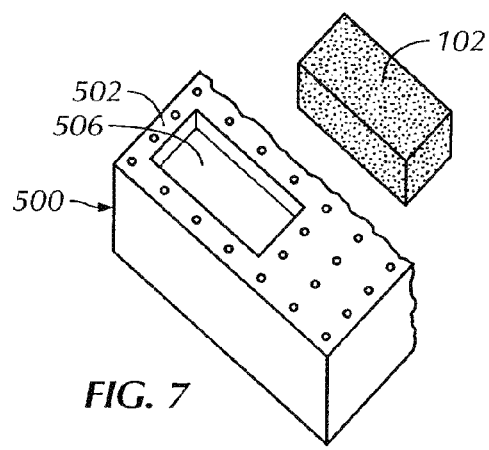
FIG. 7 is a detailed isometric view of one brick of a plurality of bricks being positioned within a brick shaped plate recess of a vacuum forming plate.
Figure 8:
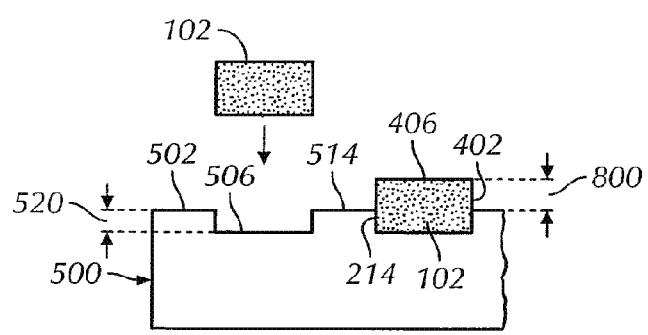
FIG. 8 is a detailed cross sectional view of a vacuum forming plate with two bricks of a plurality of bricks being positioned within brick shaped plate recesses of the vacuum forming plate.

FIG. 7 shows a portion of one example of the vacuum forming plate 500, originally shown in FIG. 5A. A brick 102 is being positioned within one of the brick shaped plate recesses 506 disposed along the vacuum plate surface 502. FIG. 8 shows a cross sectional view of the vacuum forming plate 500 after one of the plurality of bricks 102 has been positioned within a brick shaped plate recess 506 and while another brick 102 is being positioned within a separate brick shaped plate recess 506. As shown in FIG. 8, the rear brick surface 406, originally shown in FIG. 4B is positioned within the brick shaped plate recess 506 and the decorative brick surface 400 originally shown in FIG. 4A, is exposed and faces in the same direction as the vacuum plate surface 502.

As previously shown in FIG. 6, the bricks 102 are offset from each other according to offset spacing 514. The offset spacing 514 corresponds to grout ridges 204 of the custom brick film tray 200 after the polymer film is vacuumed around the plurality of bricks 102 on the vacuum forming plate 500. As shown, the plurality of bricks 102 are spaced from each other according to the offset spacing 514 that defines the spacing provided by the grout lines (e.g., grout lines 110) in the specified wall pattern for the brick façade wall. Similarly, the decorative rear brick surface 406 is recessed within the brick shaped plate recess 506 from the vacuum plate surface 502 according to the recess distance 520 shown in FIG. 8. The remaining portion 800 of the height of the brick 102 protrudes beyond the vacuum plate surface 502. The remaining portion 800 of the bricks 102 corresponds to a height of the side portion 402 of the brick 102 shown in FIG. 4A. The side portion 402 is part of the side 212 of the brick 102. The side 212 further includes the remainder portion 214, and the remainder portion is concealed within the brick shaped plate recess 506. It is the remainder portion 214 of the plurality of bricks 102 that is received within the brick façade wall 100 (see FIG. 1). The recess distance 520 thereby determines how much of the brick sides 212 is received within the brick façade wall 100 and how much of the brick sides 212 are positioned within the brick shaped tray recesses 202 and will form the exposed brick side portions 402 extending out of the wall.

Figure 9A:
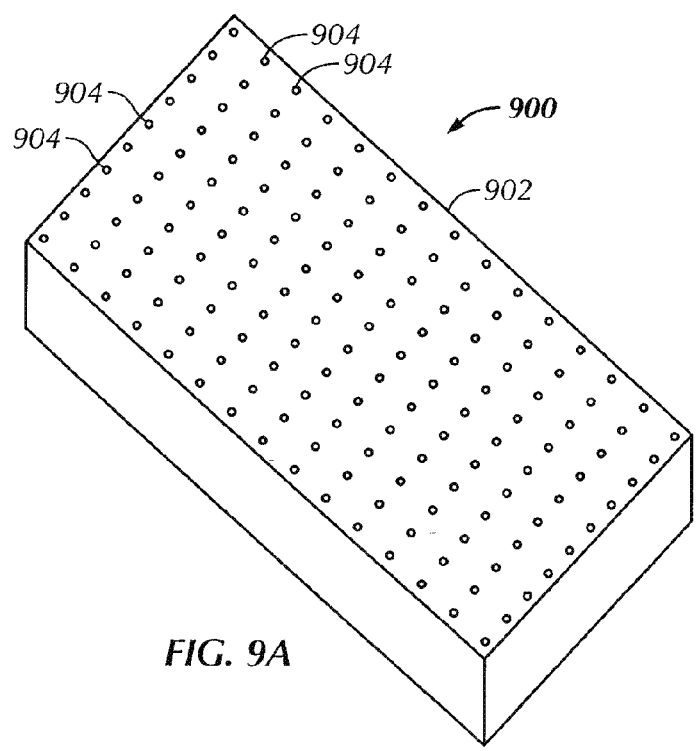
FIG. 9A is an isometric view of one example of a planar vacuum forming plate.

Another example of a vacuum forming plate 900 is shown in FIG. 9A. As with the previous examples of the vacuum forming plates 500, 508 the vacuum forming plate 900 includes a vacuum plate surface 902 and a plurality of vacuum holes 904 extending through the vacuum plate surfaces 902. As shown in FIG. 9A the vacuum plate surface 902 is a planar surface as opposed to the vacuum plate surfaces 502, 510 shown in FIGS. 5A, 5B. The vacuum forming plate 900 is without the brick shaped plate recesses 506 shown in FIGS. 5A, 5B. Instead the planar vacuum plate surface 902 has the vacuum holes 904 arranged throughout the vacuum plate surface. In one example, the plurality of bricks 102 are positioned on the vacuum plate surface 902 in the specified wall pattern. A polymer film used to form a custom brick film tray (e.g., tray 200 shown in FIGS. 2 and 3) is placed over the bricks 102 to form a custom brick film tray where the plurality of bricks 102 are fully received within brick shaped tray recesses of the custom brick film tray. In other words, the custom brick film tray formed with just the vacuum forming plate 900 shown in FIG. 9A is without any portion of the bricks 102 extending out of the brick shaped tray recesses of the tray. Optionally, the user is able to arrange the plurality of bricks 102 in any desired wall pattern without a template, such as the templates provided by the brick shaped plate recesses 506 in the vacuum plate surfaces 502, 510 shown in FIGS. 5A, 5B. Custom wall patterns are thereby easily assembled on the vacuum forming plate 900 for unique wall pattern designs.

Figure 9B:
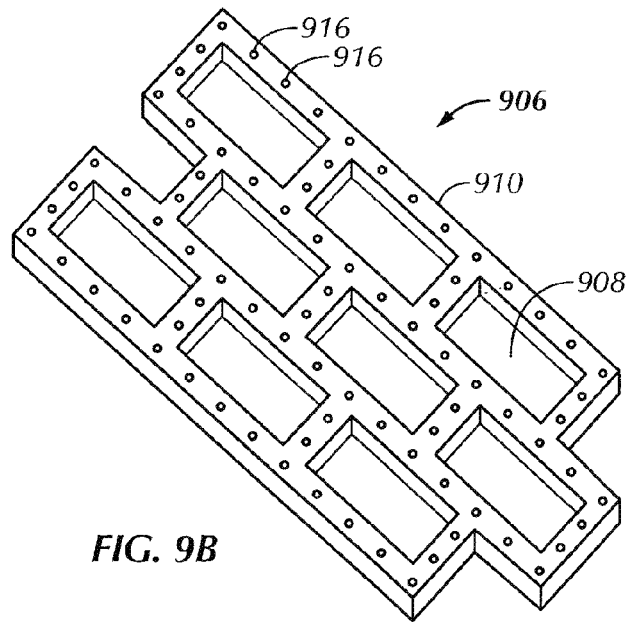
FIG. 9B is an isometric view of one example of a wall pattern grid positionable over the planar vacuum forming plate.

Referring now to FIG. 9B, one example of a wall pattern grid 906 is shown. The wall pattern grid 906 consists of a raised profile having an upper surface 910 and brick shaped grid recesses 908. The wall pattern grid 906 is positionable on the vacuum forming plate 900 to form a composite vacuum plate surface including the vacuum plate surface 902 and the wall pattern grid 906. With the wall pattern grid 906 positioned on the vacuum forming plate 900 the plurality of bricks, such as bricks 102, are positioned within the brick shaped grid recesses 908 of the wall pattern grid. In one example, the wall pattern grid 906 includes vacuum holes 916 extending therethrough. The vacuum holes 916 communicate with the vacuum holes 904 of the vacuum forming plate 900. A polymer film is laid over the wall pattern grid 906 with the plurality of bricks 102 disposed therein and the film is vacuum formed over the wall pattern grid and the vacuum forming plate 900 to form a custom brick film tray, for instance the custom brick film tray 200 shown in FIGS. 2 and 3. In another example, the wall pattern grid 906 is without the vacuum holes 916. The brick shaped grid recesses 908 extend fully through the wall pattern grid 906 and a vacuum is applied through the brick shaped grid recesses 908 by the vacuum forming plate 900 to form the custom brick film tray 200. By using a plurality of wall pattern grids each having a different wall pattern (or patterns) a single vacuum forming plate 900 is usable to form a corresponding variety of custom brick film trays capable of forming a variety of brick façade walls. In one example, a selection of wall pattern grids 906 each with a different wall pattern are provided with a vacuum forming plate 900 and usable with the plate 900 to form a corresponding variety of custom brick film trays.

Figure 10:
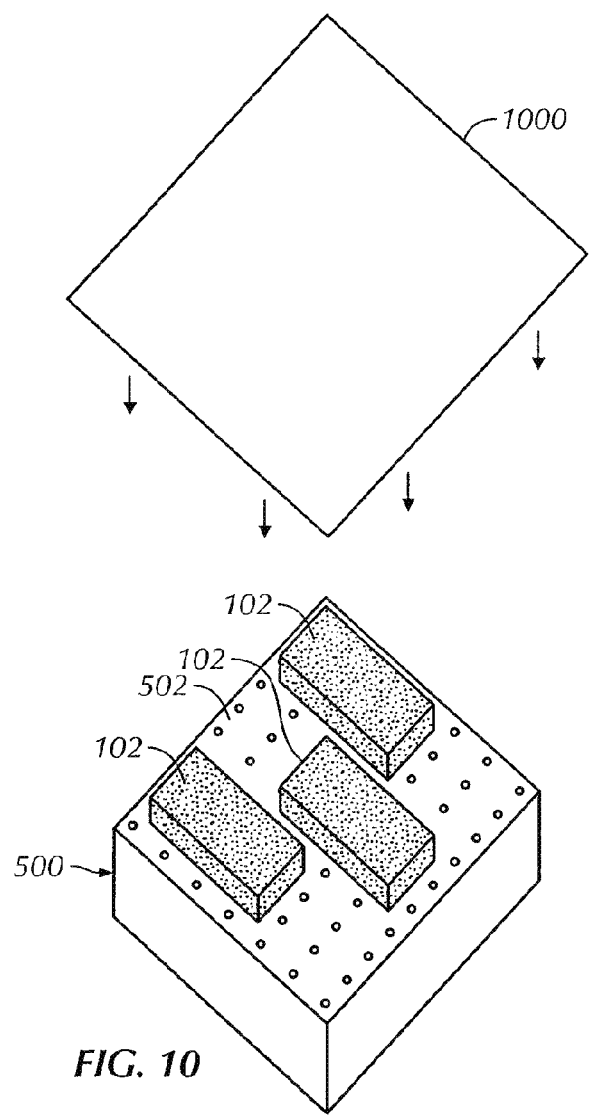
FIG. 10 is an isometric view of the vacuum forming plate with bricks positioned within the brick shaped plate recesses, and a film is being positioned over the plurality of bricks and the vacuum forming plate with the bricks therebetween.

Referring now to FIG. 10, the plurality of bricks 102 are positioned within the brick shaped plate recesses 506 of the vacuum forming plate 500 (see FIGS. 5A, 5B). A thin sheet, such as a polymer film 1000 is positioned over the plurality of bricks 102 and the vacuum forming plate 500. The polymer film 1000 is heated to a temperature just below its melting point where the polymer film 1000 is easily moldable without entering a fluid state where the polymer film 1000 would break apart over the plurality of bricks 102. The vacuum forming plate 500 applies a vacuum to the polymer film 1000 to vacuum form and mold the film over the plurality of bricks 102 and the vacuum plate surface 502 to form the custom brick film tray (e.g., tray 200 shown in FIGS. 2 and 3). In another example, the polymer film 1000 is placed over the plurality of bricks 102 where the plurality of bricks 102 are positioned on the vacuum forming plate 900 shown in FIG. 9A. The plurality of bricks 102 are positioned on the planar vacuum plate surface 902 with or without the wall pattern grid 906. The polymer film 1000 is thereafter vacuum formed and molded around the plurality of bricks 102 to form the custom brick film tray 200 shown in FIGS. 2 and 3. In yet another example, the custom brick film trays are formed with another molding process including, but not limited to injection molding, spray casting and the like.

The custom brick film tray 200 after vacuum forming the polymer film 1000 over the plurality of bricks 102 and vacuum forming plate 500 is shown in FIGS. 11A, 11B. Grout recesses 206 extend between each of the brick shaped tray recesses 202 according to the specified wall pattern of the bricks 102 on the vacuum forming plate 500. As shown in FIG. 11B, the custom brick film tray 200 includes corresponding grout ridges 204 on the opposite side of the custom brick film tray 200 from the grout recesses 206. The decorative brick surfaces 400 of the plurality of bricks 102 are concealed within the brick shaped tray recesses 202 while the rear brick surfaces 406 are positioned within the brick shaped plate recesses 506 of the vacuum forming plate 500. As previously described, the offset spacing 514 shown in FIGS. 5A and 8 correspondingly determines the dimensions of the grout recesses 206 and grout ridges 204. Similarly, the recess distance 520 of the brick shaped plate recesses 506 determines the height of the remainder portion 214 of the plurality of bricks 102 contained within the brick shaped plate recesses 506 and the height of the side portion 402 extending out of the custom brick film tray 200. To put it another way, the recessed distance 520 determines the height 800 of the side portion 402 of the plurality of bricks 102 extending into the brick shaped tray recesses 202 of the custom brick film tray 200.

Because the polymer film 1000 is vacuum formed and molded around the plurality of bricks 102 protruding out of the brick shaped plate recesses 506 of the plate 500 the polymer film 1000 assumes a corresponding contoured shaped to the plurality of bricks 102 as it is molded. The polymer film 1000 thereby assumes a corresponding tight fit around the contours of the plurality of bricks 102. Any unique features of the plurality of bricks 102 such as contoured designs, unique patterns within the bricks created due to inconsistencies during construction and the like are also assumed by the polymer film 1000 as it is molded into the custom brick film tray 200.

Each custom brick film tray 200 thereby assumes the corresponding contours and shapes of each of the bricks 102 to form a custom contoured surface that extends around the plurality of bricks 102 and tightly engages against the sides 212 of the plurality of bricks 102. The tight engagement around the sides 212 of the plurality of bricks 102 allows the custom brick film tray 200 to seal around the plurality of bricks 102. The tight engagement around the plurality of bricks 102 substantially isolates the decorative brick surface 400 of the plurality of bricks 102 (see FIG. 4A) and isolates the side portions 402 to prevent the infiltration of liquid setting materials such as concrete, resins and the like beyond the surfaces of the custom brick film tray and into the brick shaped tray recesses 202. The interface between the custom brick film tray 200 and the bricks 102 substantially prevents bleed-by of the liquid setting material into the brick shaped tray recesses 202. The liquid setting material is thereby substantially prevented from hardening on the decorative surfaces including the decorative brick surface 400 and side portions 402. Costly and labor intensive processes including cleaning and scrubbing of the decorative brick surfaces after forming into a brick façade wall, such as brick façade wall 100 are thereby avoided. Similarly, costly and labor intensive pre-pouring steps such as waxing of a mat or spraying of a plurality of bricks with a non-stick coating are thereby avoided.

Another example of a custom brick film tray 1100 is shown in FIGS. 11Ci and 11Cii formed in a similar manner to the custom brick film tray 200 formed as described and shown in FIGS. 10, 11A and 11B. The custom brick film tray 1100 is shown in FIGS. 11Ci and 11Cii with a single brick 102 disposed within a brick shaped tray recess 1102. In another example, the custom brick film tray 1100 includes a plurality of bricks 102 as has been shown in previous examples of the custom brick film tray 200. The custom brick film tray 1100 has been formed over the brick 102 with, for example, the vacuum forming plate 900 shown in FIG. 9A. As previously described, the vacuum forming plate 900 includes a planar vacuum plate 902 without brick shaped recesses. When the polymer film such as the plastic sheet 1000 shown in FIG. 10 is vacuum formed and molded over the brick 102 the custom brick film tray 1100 is formed. Referring to 11Cii, the custom brick film tray 1100 is shown with a flange surface 1104 corresponding to grout ridges 204 shown in FIG. 2. As shown in FIG. 11Cii, the flange 1104 is substantially flush with a rear brick surface 406 of the brick 102. In a similar manner to the previously described custom brick film trays, the decorative brick surface 400 is received within the brick shaped tray recess 1102 of the custom brick film tray. The sides 212 including the side portions 402 having a decorative surface similar to the decorative surface 400 are fully received within the brick shaped tray recess 1102 because of the flush interface between the flange 1104 and rear brick surface 406 of the brick 102.

In one example, an adhesive 1106 is applied to the rear brick surface 406. Adhesive 1106 includes, but is not limited to, an adhesive that is chemically activated to bond the bricks 102 with a façade wall such as a cement or concrete façade wall. In another example, the adhesive 1106 includes a heat activated adhesive that bonds the plurality of bricks 102 with a façade wall having a concrete, cement, polymer, composite material and the like. In still other examples, the adhesive includes, but is not limited to, construction adhesives, contact cements, pressure sensitive adhesives and the like. Use of the adhesive 1106 allows the custom brick film tray 1100 to be applied to an existing wall. New bricks 102 are coupled with the façade wall in the specified wall pattern of the custom brick film tray 1100 and the custom brick film tray 1100 is thereafter peeled off of the façade wall with the bricks 102 remaining coupled with the wall due to adhesion from the adhesive 1106. Custom brick film tray 1100 thereby does not need a liquid setting material poured over it to bond the bricks 102 with a façade wall. Instead the bricks 102 are couplable with an existing façade wall.

Several options are available during molding of the custom brick film tray. Referring now to FIGS. 12A through 12D, a variety of retaining features are shown for holding the plurality of bricks 1200, 1206, 1210 and 1218 within the corresponding custom brick film trays after molding of the custom brick film trays around the plurality of bricks. Referring first to FIG. 12A, one example of a brick 1200 is shown having a negative draft angle along the sides 1207 of the brick 1200. The negative draft angle tapers the brick from the decorative brick surface retained within the custom brick film tray 1201 toward the rear brick surface. As the polymer film 1000 shown in FIG. 10 is formed around the negatively drafted sides 1207 of the brick 1200 the polymer film assumes a corresponding negative drafted shape within the brick shaped tray recess 1202. As the custom brick film tray 1201 is removed from the vacuum forming plate 500 the negatively drafted brick 1200 is lifted out of the brick shaped plate recess 506 by the custom brick film tray 1201 according to engagement of the brick 1200 by the negatively drafted surfaces of the brick shaped tray recess 1202.

As shown in FIG. 12B, in another example, a brick 1206 includes frictional surfaces 1204 extending along the sides of the brick 1206. As previously described, the polymer film 1000 formed into a custom brick film tray assumes the unique contoured shape of the brick that its molded around. Where the brick includes a frictional surface 1204 the custom brick film tray 1203 molds around the frictional surface and is surfaces defining the brick shaped tray recess are immediately adjacent to the frictional surfaces. The surfaces of the brick shaped tray recess 1208 closely positioned to the frictional surfaces 1204 engage in a frictional fit with the brick 1206. After forming of the custom brick film tray 1203 on the vacuum forming plate 500 the custom brick film tray 1203 is lifted off the vacuum forming plate and the brick 1206 remains with the brick shaped tray recess and is lifted out of the brick shaped plate recess 506 due to the frictional fit between the brick 1206 and the surfaces defining the brick shaped tray recess 1208.

Referring to another example in FIG. 12C, the brick 1210 includes barbs 1212 extending from side surfaces of the brick 1210. The polymer film 1000 (See FIG. 10) is vacuum formed over the brick 1210 having the barbs 1212. The polymer film 1000 is molded over the brick 1210 and the surfaces defining the brick shaped tray recess 1216 assume a corresponding geometry to that of the barbs 1212. The barbs 1212 are thereby received within barb shaped recesses 1214 formed into the custom brick film tray 1205 during the molding process. As the custom brick film tray 1205 is removed from the vacuum forming plate 500. The barbs 1212 engage with the surfaces defining the barb receiving recesses 1214 in the custom brick film tray to thereby grasp the bricks 1210 and remove the bricks from the brick shaped plate recesses 506. In another option, the brick 1210 includes orifices, and the custom brick film tray 1204 forms corresponding barbs positioned within the orifices during molding of the tray.

Another example of a feature to retain bricks 1218 within the custom brick film tray 1207 is shown in FIG. 12D. The brick 1218 in FIG. 12D is positioned within the brick shaped plate recess 506 of the vacuum forming plate 500 with an adhesive 1220 applied over the decorative brick surface of the brick 1218 (e.g., the decorative brick surface 400 shown in FIG. 4A). The adhesive 1220 includes but is not limited to, a heat activated adhesive, a composite-philic adhesive and the like. Referring again to FIG. 10, the polymer film 1000 is positioned over the bricks 1218 and the vacuum forming plate 500, and the film is vacuum formed over the bricks 1218 in the specified wall pattern. The brick shaped tray recess 1222 is formed around the brick 1218 and the recess 1222 assumes a corresponding shape to the brick 1218. As the polymer film 1000 is formed into the custom brick fill tray 1207, the adhesive 1220 engages with the surface defining the brick shaped tray recess 1222 and adhesively engages the brick 1218 with the custom brick film tray 1207. The adhesive engagement allows the brick 1218 to remain coupled with the custom brick film tray 1207 as the tray 1207 is removed from the vacuum forming plate 500.

By using brick retaining features including, but not limited to, the retaining features shown in FIGS. 12A-D, the bricks 1200, 1206, 1210 and 1218 are retained within the corresponding custom brick film trays after forming of the trays. Custom brick film trays and the retaining features are formed in a single vacuum forming process where the polymer film 100 is molded over the bricks. As the custom brick film trays are removed from the vacuum forming plates the bricks remain coupled with the custom brick film trays and are pulled off of the vacuum forming plate 500 with the trays. Repositioning of the bricks within the tray recesses of the trays is thereby avoided.

Referring now to FIGS. 13A through 13C, another example of a brick shaped tray recess 1302 for a custom brick film tray 1300 is shown. The brick shaped tray recess 1302 shown in FIGS. 13A through 13C has a positive draft angle as shown in the cross section of FIG. 13B. Surfaces 1304 of the brick shaped tray recess 1302 thereby taper from an upper surface 1306 of the custom brick film tray 1300 toward a trough 1308 of the brick shaped tray recess 1302. As shown in FIG. 13B, the tray surfaces 1304 have a positive draft angle beta. In one example, the positive draft angle beta includes but is not limited to a range of angle measurements between 1 and 10 degrees. The brick shaped tray recesses 1302 having the positive draft angle are formed with a corresponding brick having a positive draft angle that is positioned on a vacuum forming plate, such as vacuum forming plate 500 shown in FIGS. 5A, 6 and 10. The custom brick film tray 1300 is formed around the corresponding positively drafted brick in a similar manner to the custom brick film tray 200 as shown in FIGS. 10, 11A and 11B. A polymer film 1000 is positioned over the brick and the vacuum forming plate 500 and thereafter vacuum molded over the brick the vacuum forming plate 500 to form the custom brick film tray 1300. The polymer film 1000 assumes a corresponding shape to the positively drafted brick and thereby forms the brick shaped tray recess 1302 having a corresponding positive draft angle along the tray surfaces 1304. Inclusion of tray surfaces 1304 having positive draft angles allows for easy removal of the custom brick film tray 1300 after formation of the brick façade wall, such as the brick façade wall 100 shown in FIG. 1. That is to say having the positive draft angle allows for easy peeling of the custom brick film tray 1300 from the bricks coupled with the brick façade wall 100.

Figure 14A:
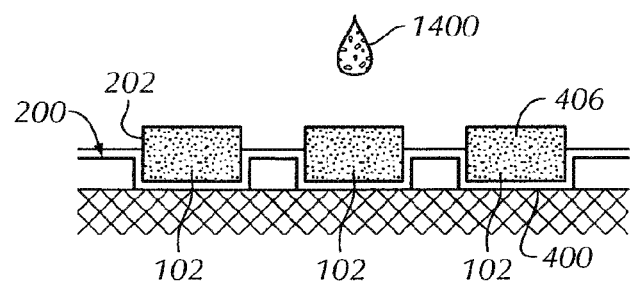
FIG. 14A is a cross sectional view of one example of the custom brick film tray including a plurality of bricks while a liquid setting material is pored over the bricks and the tray.

Referring now to FIG. 14A, one example of the custom brick film tray 200 including the plurality of bricks 102 disposed therein is shown. As previously described, the plurality of bricks 102 are received within brick shaped tray recesses 202 of the custom brick film tray 200. As shown, the custom brick film tray 200 with the plurality of bricks 102 is rested upon a substantially flat surface. A liquid setting material 1400 is thereafter poured over the custom brick film tray 200 and the bricks 102. In one example, the liquid setting material 1400 includes concrete. The liquid setting material 1400 includes, but is not limited to, a cement based mixture, a resin based mixture, and the like. As shown in FIG. 14A, the rear brick surfaces 406 are exposed out of the custom brick film tray 200 and contact the liquid setting material 1400 during the pouring process. The decorative brick surfaces 400 are concealed within the brick shaped tray recesses 202 and thereby isolated from the liquid setting material during the pouring process. After the liquid setting material 1400 hardens around the plurality of bricks 102 and over the custom brick film tray 200 the brick façade wall 100 is formed (see FIG. 1 and FIG. 14B). The plurality of bricks 102 are set within the hardened material of the brick façade wall 100.

Figure 14B:
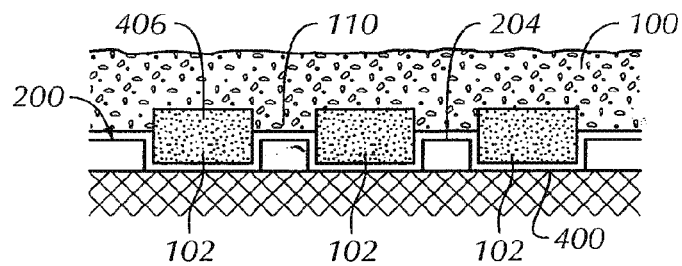
FIG. 14B is a cross sectional view of the custom brick film tray of FIG. 14A with the liquid setting material hardened to form a brick façade wall.
Figure 14C:
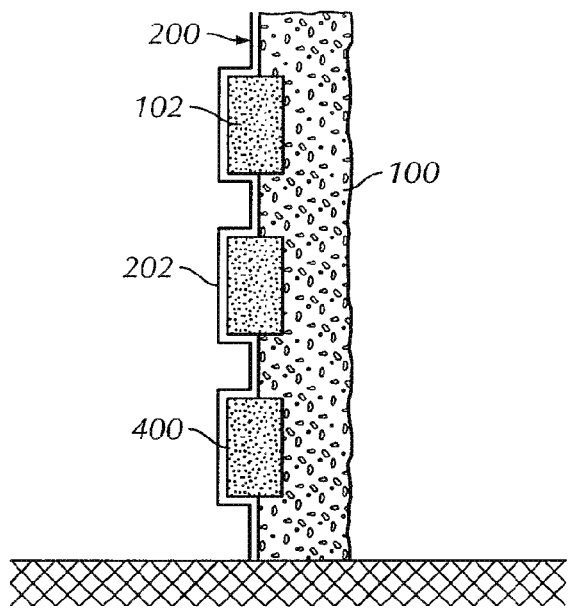
FIG. 14C is a cross sectional view of the brick façade wall shown in FIG. 14B in a vertical orientation with the custom brick film tray retained along the plurality of bricks.

As shown in FIG. 14B and previously described, the custom brick film tray 200 arranges the plurality of bricks 102 in a specified wall pattern. Because the brick façade wall is molded around the bricks 102 and the custom brick film tray 200 having the specified wall pattern, the brick façade wall formed over the tray and bricks has the configuration of the specified wall pattern. The specified wall pattern of the custom brick film tray 200 provides for grout lines 110 correspondingly formed within the grout ridges 204 of the tray 200. The grout lines and the bricks 102 provide the decorative appearance of the brick façade wall 100. Referring now to FIG. 14C, the brick façade wall 100 is moved into a substantially vertical orientation where the custom brick film tray 200 is removable as will be described further below. The plurality of bricks 102 are contained within the brick façade wall 100 in the specified wall pattern with the decorative brick surfaces 400 directed away from the wall 100.

Figure 14D:
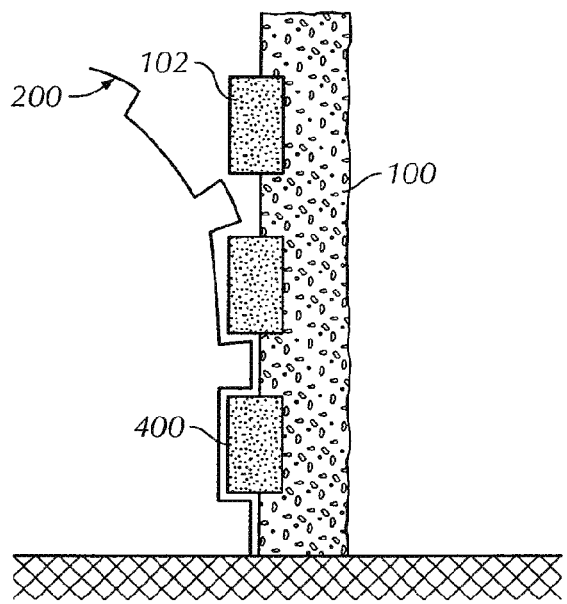
FIG. 14D is a cross sectional view of the brick façade wall shown in FIG. 14C as the custom brick film tray is peeled from the brick façade wall.
Figure 14E:
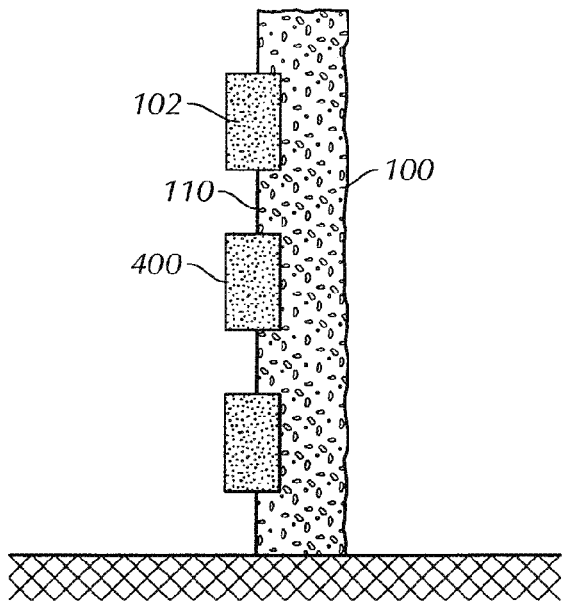
FIG. 14E is a cross sectional view of the brick façade wall after removal of the custom brick film tray.

After the brick façade wall 100 is erected, the custom brick film tray 200 is peeled off of the brick façade wall 100. In one example, the custom brick film tray 200 is retained along the brick façade wall 100 after formation of the brick façade wall. The custom brick film tray 200 is retained along the brick façade wall to protect the brick façade wall including the decorative bricks 102 contained therein during storage, transport, and the like. For instance, the brick façade wall 100 is constructed away from a work site and placed into storage until needed. The custom brick film tray 200 provides a convenient and tightly fitting protective covering over the brick façade wall 100 and the decorative bricks 102 to protect the brick façade wall prior to its assembly into a structure. As shown in FIG. 14D, once the brick façade wall 100 is erected the custom brick film tray 200 is peeled from the wall 100 including the plurality of bricks 102 thereby exposing the plurality of bricks 102 including the decorative brick surfaces 400. The custom brick film tray 200 is thereafter discarded, recycled or reused with replacement bricks 102 to form a separate brick façade wall. The finished brick façade wall 100 as shown in FIG. 14E includes the plurality of bricks 102 in the specified wall pattern with the grout lines 110 therebetween to create a decorative aesthetic looking wall surface. Referring again to FIGS. 13A through 13C, in one example, the plurality of bricks have a positive draft angle (see FIG. 13B) with the tapered tray surfaces 1304 providing the bricks 102 and the custom brick film tray 200 with corresponding positively drafted surfaces. The positively drafted surfaces allow for easy peeling of the custom brick film tray 200 from the bricks 102 and the brick façade wall 100 thereby facilitating unpacking of the brick façade wall 100 dulling its assembly at a work site.

Additionally, and as described in more detail below, the positive draft surfaces of the plurality in bricks 102 facilitate draining of fluid such as rain water off of the bricks 102. For example, the positive draft angles direct flow of fluid incident against the brick façade wall 100 down the slopes of the positive draft surfaces of the bricks 102 and away from the wall 1000. Further discussion of the rain diverting properties of a positively drafted brick and corresponding custom brick film tray are described later and shown in FIGS. 18 through 20.

By using this method for molding the custom brick film tray 200 and forming the brick façade wall 100 with the tray 200 a brick façade wall having any desired wall pattern may be constructed according to the arrangement of the bricks in the desired wall pattern prior to forming of the tray. In one example, the custom brick film tray 200 with the plurality of bricks 102 is molded around the plurality of bricks 102 at a factory. The custom brick film trays 200 with the plurality of bricks 102 are packaged onto pallets or similar containers and transported to the work site for construction of a brick façade wall using the trays. The laborers at the work site are able to assemble the custom brick film trays 200 molded around the bricks 102 into the desired size and shape for the brick façade wall 100. Liquid setting material is then brought in, for instance by truck, and poured over the custom brick film trays 200 and the bricks disposed therein. After the liquid setting material hardens the brick façade wall 100 is moved into a vertical orientation and the custom brick film tray 200 is peeled off of the bricks 102 and brick façade wall 100 to expose the wall.

In another example, the custom brick film tray 200 is molded around the plurality of bricks 102 at a factory. The custom brick film trays 200 with the plurality of bricks disposed therein are arranged into the desired size and shape of the brick façade wall. The liquid setting material is then poured over the custom brick film trays 200 and the plurality of bricks to form a brick façade wall 100 having the bricks in the specified wall pattern according to the spacing and arrangement of the bricks in the molded tray 200. The brick façade wall 100 is then stored until needed with the custom brick film tray 200 disposed over the plurality of bricks 102 and the wall 100 to act as a protective coating during storage and transport. The brick façade wall 100 is then transported to a work site with the tray 200 coupled over the wall and bricks. When the brick façade wall 100 is assembled into a structure and the custom brick shaped tray 200 is no longer needed for protection of the wall the tray 200 is peeled from the brick façade wall to uncover the aesthetic bricks in the specified wall pattern.

Figure 15:
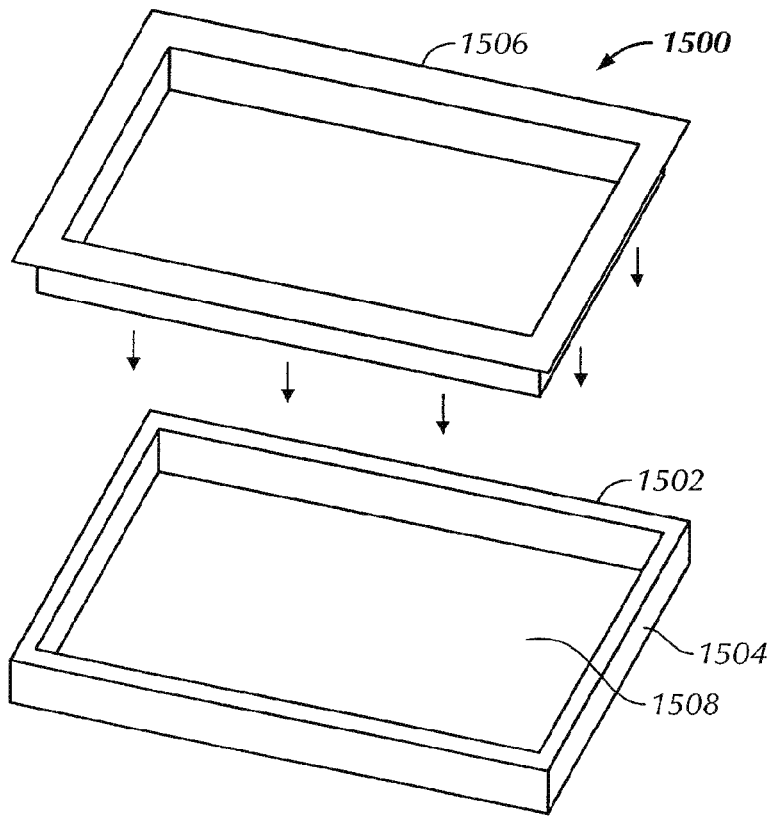
FIG. 15 is an isometric view of one example of a custom brick film tray positionable within a structural support grid.

Referring now to FIG. 15, one example of a support grid 1502 is shown. Support grid 1502 is couplable with a custom brick film tray 1500. In one example, the custom brick film tray 1500 includes the custom brick film tray 200 shown in FIGS. 2 and 3. For example, the custom brick film tray includes a plurality of bricks 102 disposed within individual brick shaped tray recesses 202. As previously described, the custom brick film tray 200 and the custom brick film tray 1500 shown in FIG. 15 are constructed with a polymer film 1000 vacuum formed over the plurality of bricks 102 as shown in FIGS. 10 and 11A to 11Cii. The polymer film 1000, in one example, is a structurally flexible material able to warp and fracture according to forces applied to the custom brick film tray 200, 1500. The support grid 1502 receives the custom brick film tray 200, 1500, in one example, and provides structural support to the custom brick film tray and substantially prevents the warping and fracture of the custom brick film trays. As shown in FIG. 15, in one example, the support grid 1502 includes a support grid perimeter 1504 extending around the circumference of the support grid 1502. In another example, the support grid 1502 is open through the center and the support grid 1502 is constructed entirely of the support grid perimeter 1504. That is to say, the outer most flanges 1506 of the custom brick film tray 1500 are supported by the support grid perimeter 1504 providing structural integrity to the custom grid film tray 1500 to substantially prevent warping and fracture of the tray 1500 during storage, transport and use at a work site (e.g., pouring of a liquid setting material over the custom grid film tray 1500). In still another example, the support grid 1502 includes a closed bottom coupled with the support grid perimeter 1504. In one example, the closed bottom includes surface 1508 constructed of a similar structural material to the support grid 1502. In one example, the support grid 1502 is constructed of a material having greater rigidity than the custom brick film tray 200, 1500 (e.g., a wooden frame, metal frame, composite frame and the like).

Figure 16:
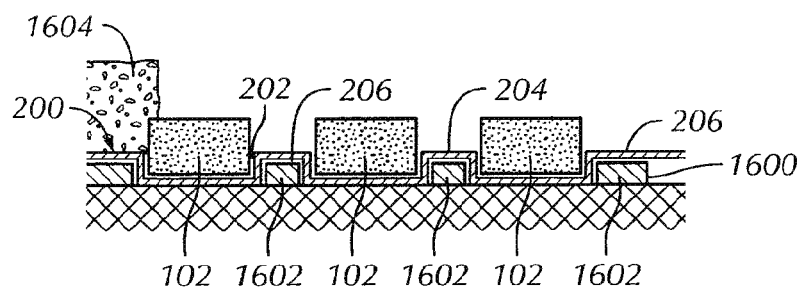
FIG. 16 is an isometric view of one example of a structural support grid positionable within grout recesses of the custom brick film tray.

Another example of a support grid 1600 is shown in FIG. 16. The support grid 1600 includes support grid members 1602 sized and shaped to fit within the grout recesses 206 of the custom brick film tray 200. The support grid 1600 thereby has a corresponding shape to the grout recesses 206 extending through the custom brick film tray 200 to fully support the grout ridges 204 above the grout recesses 206. As shown in FIG. 16, the plurality of bricks 102 are set within the brick shaped tray recesses 202 of the custom brick film tray 200. A liquid setting material 1604 shown in partial cutaway is poured over the plurality of bricks 102. The support grid 1600 including the support grid members 1602 supports the grout ridges 204 under the weight of the liquid setting material 1604 and substantially prevents failure of the thin polymer material forming the film at the grout ridges 204. The support grid 1600 thereby maintains the shape of the custom brick film tray 200 in the specified wall pattern and allows the liquid setting material 1604 to form the grout lines 110 (FIG. 1) without the possibility of the liquid setting material fracturing the film at the grout ridges 204 to form inconsistent and non-aesthetic grout lines.

In another example, the support grid 1600 is assembled with the support grid 1502 to form a composite support grid having the support grid perimeter 1504 and support grid members 1602. In such an example, the composite support grid would have a circumscribing perimeter 1504 extending around the support grid members 1602 where the support grid perimeter 1504 would provide support to the custom brick film tray flange 1506 and the support grid members 1602 would support the grout ridges 204 of the custom brick film tray 200.

In one example, the support grids 1502, 1600 are constructed with but not limited to metal, wood, composites, and the like. In one example, the support grid 1502 is constructed with a metal outer shell in the support grid perimeter 1504. In the case of the support grid 1600, the support grid member 1602 are constructed in another example with a wire mesh material configured to fit within the grout recesses 206 of the custom brick film tray 200. In another example, after formation of the custom brick film tray 200 the support grid 1600 is formed by pouring a hardenable material within the grout recesses 206 to form the support grid member 1602. In one option, the hardenable material includes a plaster, a composite that is easily separable from the grout recesses 206, a clay support structure and the like. As previously described, the support grid 1600 including the support grid members 1602 provides support to the grout ridges 204 during the pouring of the liquid setting material 1604. After hardening of the liquid setting material 1604 and assembly of the brick façade wall 100 to a structure the custom brick film tray 200 is peeled from the brick façade wall along with the support grid 1600. Because the support grid 1600 is constructed with material such as clay, plaster, composites and the like the custom brick film tray 200 is easily peeled off of the brick façade wall. For instance, with a brittle plaster support grid 1600 the plaster therein breaks apart because of bending or flexural loads applied to the custom brick film tray 200 during peeling. In another example, where the support grid 1600 is constructed with a malleable clay, peeling of the custom brick film tray 200 from the brick façade wall 100 deforms the clay within the grout recesses 206 allowing the tray to be easily peeled from the brick façade wall 100.

Figure 17:
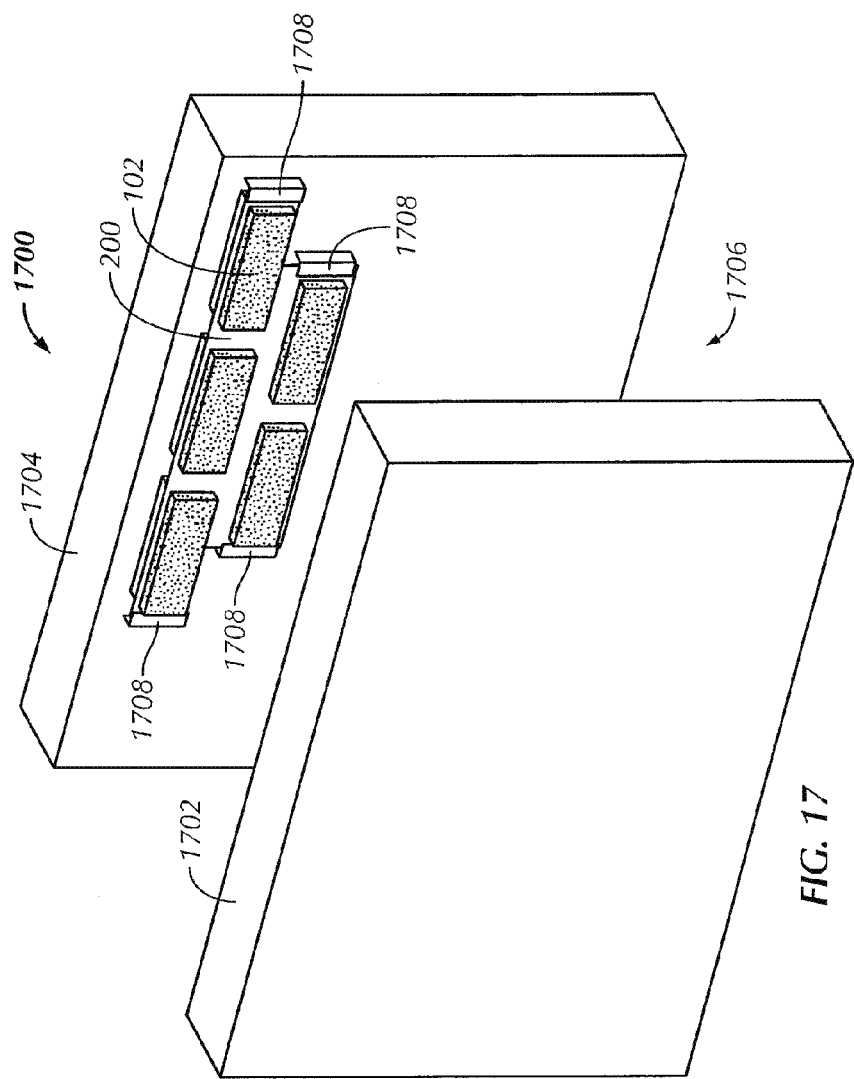
FIG. 17 is a detailed cross sectional view of one example of a custom brick film tray positioned within a vertical form.

FIG. 17 shows one example of a vertical form 1700 configured to construct a brick façade wall, such as brick façade wall 100 in a vertical orientation (in contrast to the horizontal orientation shown in previous examples). As shown in FIG. 17, the vertical form 1700 includes a first form surface 1702 and a second form surface 1704. In the example shown, at least one of the vertical form surfaces 1702, 1704 is configured to receive the custom brick film tray 200 including the plurality of bricks 102. The second form surface 1704 includes at least one coupling feature 1708 configured to retain the custom brick film tray 200. As shown in FIG. 17, at least the second form surface 1704 is configured to retain at least one custom brick film tray 200. Optionally, the first form surface 1702 retains at least one custom brick film tray 200 as well. In another example, the second form surface 1704 is configured to retain a plurality of custom brick film trays 200. In one example, the coupling feature 1708 include brackets extending along the second formed surface 1704. The brackets are configured to couple the custom brick film tray with the second formed surface 1704. In another example, the coupling feature 1708 include, but are not limited to, adhesives, pins, mechanical fittings, screws, bolts and the like. In still another example, at least one of the first formed surface 1702 and second formed surface 1704 are constructed with slots sized and shaped to receive the custom brick film tray 200 therein and present the custom brick film tray towards an interior space 1706 between the first and second formed surfaces 1702, 1704.

With the custom film trays 200 positioned within the vertical form 1700 liquid setting materials, such as liquid setting material 1400 shown in FIG. 14A, is poured within the space 1706 and allowed to harden into the brick façade wall. The vertical form 1700 including the first and second formed surfaces 1702, 1704 is subsequently removed along with the custom brick film trays 200 revealing the brick façade wall 100. In still another example, removal of the vertical form 1700 leaves the custom brick film tray 200 along the brick façade wall 100 (e.g., for protection of the brick façade during storage and transportation). When desired the custom brick film tray 200 is peeled from the bricks 102 as previously described in other examples (e.g., at a construction site after assembly of the wall into a structure).

Figure 18:
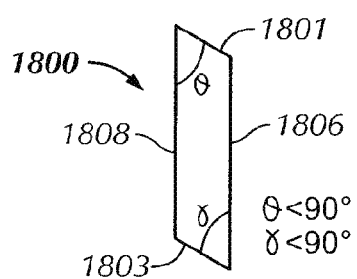
FIG. 18 is a cross sectional view of a brick having a first side positive draft angle and a second opposed side negative draft angle.
Figure 19:
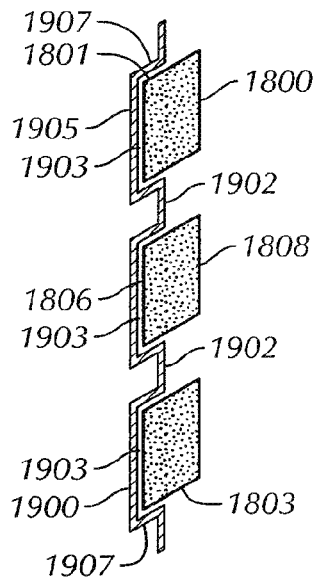
FIG. 19 is a detailed cross sectional view of a custom brick film tray having brick film tray recesses with positive and negative draft angles according to the bricks disposed within the recesses.
Figure 20:
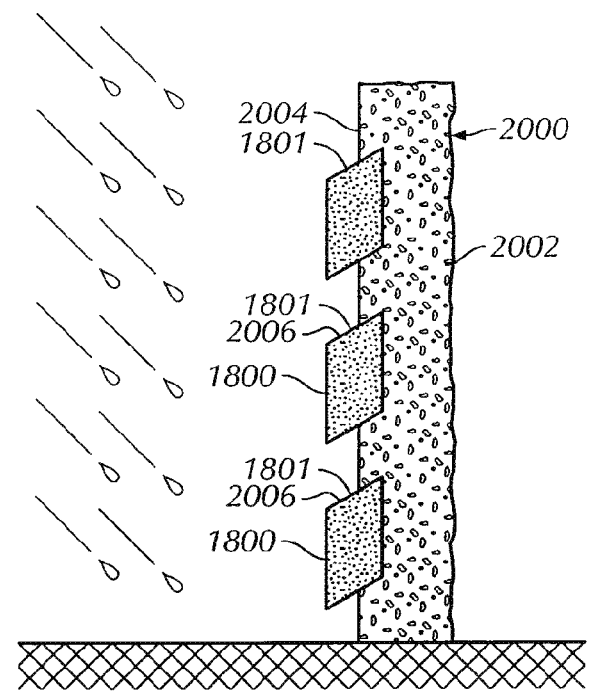
FIG. 20 is a cross sectional view of a brick façade wall having a plurality of bricks with a water diverting draft angle according to the orientation of the plurality of bricks within the custom brick film tray.

Another example of an assembly of a custom brick film tray 1900 and a corresponding plurality of custom bricks 1800 is shown in FIGS. 18-20. Referring to FIG. 18, one example of a brick 1800 is shown. The brick 1800 includes a decorative brick surface 1806 and a brick rear surface 1808. The brick further includes a positively drafted surface 1801 and a negatively drafted surface 1803. As shown in FIG. 18, positively drafted surface 1801 is at an angle θ relative to the rear brick surface 1808. In the example shown in FIG. 18, θ measures less than 90 degrees to form a positively sloping angle for the positive draft surface 1801. In another example, the brick 1800 includes the negatively drafted surface 1803 at an angle γ less than 90 degrees relative to the decorative brick surface 1806. In still another example, the brick 1800 includes a single drafted surface such as positively drafted surface 1801 and the surface corresponding to the negatively drafted surface 1803 is at an angle gamma relative to the decorative brick surface 1806 equal to or greater than 90 degrees (e.g., similar to the positively drafted angles shown in FIGS. 13A through 13C). As will be described in greater detail below, the positive draft surfaces 1801 of the plurality of bricks 1800 allow for liquids such as rain that are incident to the brick façade wall to divert away from the wall to avoid water buildup on the bricks 1800 and the wall.

Referring now to FIG. 19, the plurality of bricks 1800 are shown within a custom brick film tray 1900 vacuum formed around the bricks. In one example, the custom brick film tray 1900 is formed in a substantially similar method to that shown in FIGS. 10 through 11Cii. For instance, the plurality of bricks 1800 are positioned within brick shaped plate recesses of the vacuum forming plate and a thin composite sheet, such as a polymer film is placed over the plurality of bricks 1800 and vacuum molded over the plurality of bricks to form the custom brick film tray 1900. Referring again to FIG. 19, the custom brick film tray 1900 includes a plurality of grout ridges 1902 extending between the brick shaped tray recesses 1903. As shown, the plurality of bricks 1800 are arranged in substantially similar orientations with the positively drafted surfaces 1801 directed in a first direction and the negatively drafted surfaces 1803 directed in an opposed direction.

FIG. 20 shows one example of a brick façade wall 2000 including the plurality of bricks 1800 positioned within the wall after pouring of a liquid setting material over the tray 1900 and the bricks 1800 therein. As shown, the plurality of bricks 1800 are positioned on an exterior portion of the wall 2004. In one option, the interior surface 2002 is similarly decorated with a plurality of bricks coupled to the brick façade wall 2000 in a similar manner to the method used with the custom brick film tray 1900. For instance, multiple trays 1900 are positioned on both sides of a vertical form and the liquid setting material is poured therebetween. As shown in FIG. 20, the positively drafted surfaces 1801 of the plurality of bricks 1800 are oriented in the same direction. The positively drafted surfaces 1801 provide a plurality of rain diverting surfaces 2006 configured to direct moisture such as rain incident against the brick façade wall 2000 away from the wall. That is to say, as rain falls against the wall the rain diverting surfaces 2006 direct the rain to flow away from the exterior surface 2004 of the wall 2000. Such an arrangement of bricks with a positively drafted surface 1801 substantially prevents the buildup of rain water along the bricks 1800 and assists in increasing the service life of the brick façade wall 2000 by preventing the buildup of moisture and ice created from such moisture in a cold environment. In still another example, the positively drafted surfaces 1801 and negatively drafted surfaces 1803 cooperate to create an aesthetically unique appearance to the brick façade wall 2000 that differentiates the appearance of the wall 200 from other standard walls including contemporary bricks without draft angles. Optionally, the use of the positively drafted surfaces 1801 facilitates the peeling of the custom brick film tray 1900 from the brick façade wall 2000. The positively drafted surfaces 1801 form a correspondingly gently sloped surface in the tray 1900 that easily peels away from the positively drafted surfaces and subsequently peels away from the brick decorative surfaces 1806.

Figure 21:
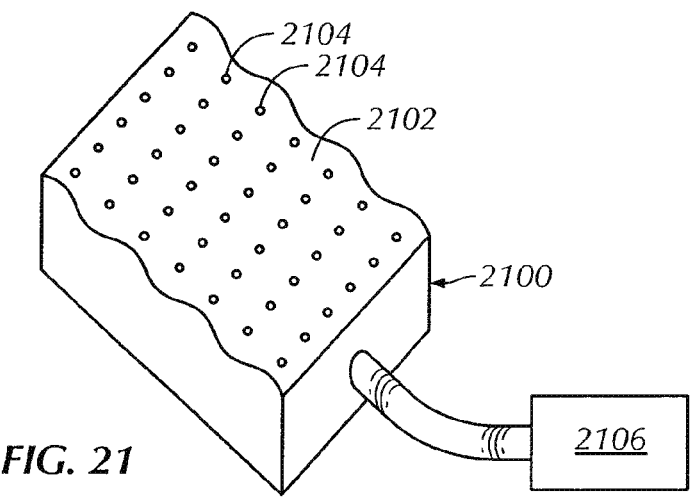
FIG. 21 is an isometric view of one example of a vacuum forming plate having a decorative contoured surface.
Figure 22A:
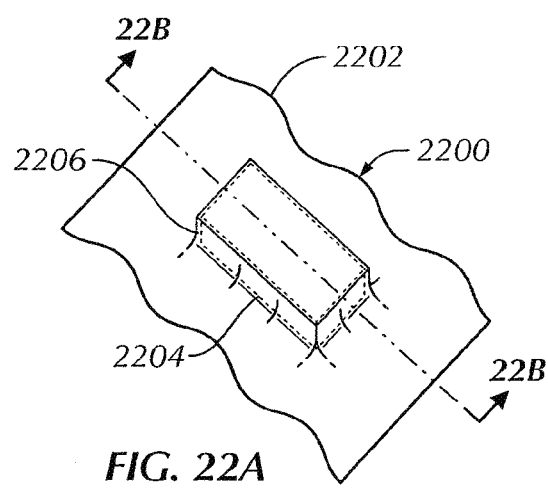
FIG. 22A is an isometric view of one example of a custom brick film tray having a corresponding molded decorative contoured surface.
Figure 22B:
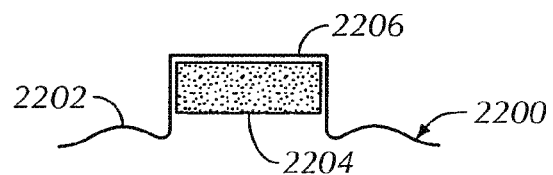
FIG. 22B is a cross sectional view of the custom brick film tray shown in FIG. 22A taken along line 22A-22A.

Another example of a vacuum forming plate 2100 is shown in FIG. 21. Vacuum forming plate 2100 includes a contoured vacuum plate surface 2102 having vacuum holes 2104 extending through the contoured vacuum plate surface. A vacuum source such as a vacuum pump 2106 is in communication with the vacuum forming plate 2100 to provide the vacuum necessary to mold a thin film over a brick or a plurality of bricks positioned on the contoured vacuum plate surface 2102 to form a custom brick film tray as previously described. Referring to FIGS. 22A and 22B, one example of a custom brick film tray 2200 formed with contoured vacuum forming plate 2100 is shown. The custom brick film tray 2200 includes a contoured surface 2202 having a corresponding shape to the contoured vacuum plate surface 2102 shown in FIG. 21. As described in previous examples, a brick such as brick 2204 and a plurality of bricks such as bricks 2204 are positioned on the contoured vacuum plate surface 2102. A thin film such as a polymer film at a temperature below the melting point is positioned over the plurality of bricks 2204 and then vacuum formed over the plurality of bricks to form the custom brick film tray 2200. As shown in FIG. 22A, the custom brick film tray 2200 includes a brick shaped tray recess 2206 molded around the brick 2204 during the vacuum forming process.

The thin film used to form the custom brick film tray 2200 assumes the shape of the contoured vacuum plate surface 2102. That is to say, the custom brick film tray 2200 includes a contoured surface 2202 in the shape of the contoured vacuum plate surface 2102. In one example, the contoured tray surface 2202 has a decorative corrugated geometry as shown in FIGS. 22A, 22B. The contoured tray surface 2202 includes, but is not limited to, a contoured monogram surface, a contoured decorative pattern surface, a contoured letter surface, a contoured pictorial surface, and the like formed by molding over a corresponding vacuum plate surface. When a liquid setting material is poured over the bricks 2204 and the contoured tray surface 2202 a brick façade wall is formed with contoured grout ridges (see grout ridges 204 in FIGS. 2 and 3) that present the decorative contoured appearance.

One example of a system 2301 to align a plurality of custom brick film trays such as custom film trays 2300, 2302 is shown in FIGS. 23A through 23C. As shown in FIG. 23A, the first custom brick film tray 2300 includes coupling features 2304. The second custom brick film tray 2302 includes corresponding coupling features 2306. In one example, the coupling features 2304, 2306 include correspondingly shaped surfaces of the custom brick film tray 2300, 2302 sized and shaped to interfit to position the custom brick film trays together so that the plurality of the bricks position within the custom brick film trays are maintained in a specified wall pattern across the plurality of trays. The coupling features 2304, 2306 include, but are not limited to, mechanical locking features, friction fit features, adhesives, straps, bolts, screws, and the like configured to position the first custom brick film tray 2300 relative to the custom brick film tray 2302 to maintain the specified wall pattern.

Referring now to FIGS. 23B, 23C, the custom brick film trays 2300, 2302 are shown coupled together to form a composite custom brick film tray assembly 2303. As shown the coupling features 2304, 2306 are overlapped and include flanges sized and shaped to position the bricks adjacent to the coupling features 2304, 2306 with the width of a grout ridge 2307 between the bricks 2305. By spacing the plurality of bricks within the custom brick film trays 2300, 2302 the specified wall pattern is maintained across the custom brick film trays. A plurality of bricks 2305 are positioned within the custom brick film trays 2300, 2302 either before or after assembly of the trays into the composite custom brick film trays assembly 2303. For instance, the custom brick film trays 2300, 2302 are molded around the bricks 2305. The custom brick film trays 2300, 2302 with the bricks 2305 positioned within the brick shaped tray recesses 2308, 2310 are positioned together to form the specified wall pattern. In yet another example, the custom brick film trays 2300, 2302 are assembled together to form the custom brick film tray assembly 2303 without the plurality of bricks disposed within the brick shaped tray recesses 2308, 2310. Assembly of the custom brick film trays without the bricks positioned therein allows for easy assembly of the custom brick film trays into the composite assembly 2303. After assembly into the composite brick film tray assembly 2303 the plurality of bricks 2305 are positioned within the brick shaped tray recesses 2308, 2310 in preparation for pouring of the liquid setting material over the custom brick film tray assembly 2303.

As shown in FIGS. 23A through 23C, a plurality of custom brick film trays are assembled into a composite brick film tray assembly to allow for the assembly of a plurality of bricks in a specified wall pattern for any conceivable wall size. That is to say, a number of custom brick film trays are assembled into the specified wall pattern with each custom brick film tray maintaining the wall pattern within its own boundaries. With the plurality of custom brick film trays formed into the tray assembly of a desired shape and size corresponding to the dimensions of a brick façade wall, the liquid setting material is poured over the assembly to form the brick façade wall. The plurality of custom brick film trays are thereafter peeled away from the brick façade wall to expose the bricks 2305 disposed within the wall. In one option, the custom brick film trays are maintained on the brick façade wall during storage and transportation and the multiple trays are peeled away from the brick façade wall when the brick façade wall is assembled into a structure at the work site.

Figure 24:
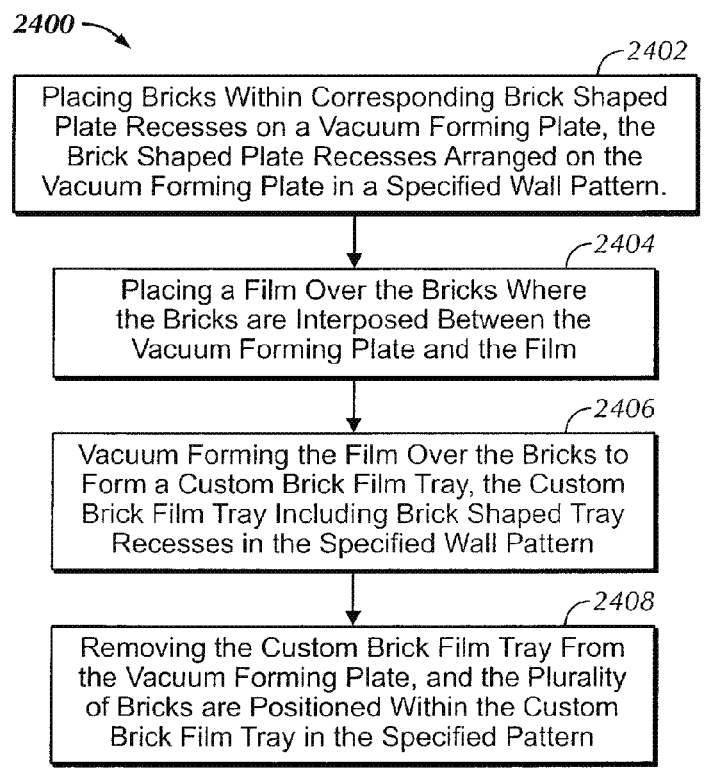
FIG. 24 is a block diagram showing one example of a method for forming a brick façade positioning assembly.

FIG. 24 shows one example of a method 2400 for forming a brick façade positioning assembly such as the custom brick film tray 200 shown in FIGS. 2 and 3. Method 2400 is not limited to the custom brick film tray 200 its related components, and where applicable is intended to include any of the other custom brick film trays and components previously described. At 2402, the method 2400 includes placing bricks such as a plurality of bricks 102 within brick shaped plate recesses 506 on a vacuum forming plate 508 as shown for example in FIG. 5A, 5B. The brick shaped plate recesses 506 are arranged on the vacuum forming plate 500, 508 in a specified wall pattern. The specified wall pattern corresponds to a desired pattern of bricks within a brick façade wall, such as the brick façade wall 100 shown in FIG. 1. At 2404, a film such as a polymer film, or film 1000 as shown in FIG. 10, is placed over the plurality of bricks 102 where the bricks are interposed between the vacuum forming plate and the film 1000. As shown in FIG. 8, the plurality of bricks 102 are positioned within the brick shaped plate recesses 506 in the specified wall pattern with the decorative brick surfaces 400 facing away from the vacuum forming plate 500 (e.g., adjacent to the film 1000). At 2406, the film 1000 is vacuumed formed over the plurality of bricks 102 to form a custom brick film tray, such as custom brick film tray 200 shown in FIGS. 2 and 3. Custom brick film tray 200 includes brick shaped tray recesses 202 in the specified wall pattern mirroring how the plurality of bricks 102 are arranged on the vacuum forming plate 500. The brick shaped tray recesses are formed around the plurality of bricks 102 by the vacuum forming process. The decorative brick surfaces 400 are concealed within the brick shaped tray recesses 202 as shown for example in FIG. 11B. At 2408, the custom brick film tray 200 is removed from the vacuum forming plate 500 and the plurality of the bricks 102 are positioned within the custom brick film tray 200 in the specified wall pattern.

Several options for the method 2400 follow. In one example, vacuum forming film 1000 over the plurality of the bricks 102 includes custom forming each brick shaped tray recess 202 according to the unique shapes and surfaces of the individual bricks 102 within each brick shaped tray recess 202. That is to say the unique surfaces of each of the bricks 102 of the plurality of bricks includes unique contoured surfaces formed in the bricks 102, for instance during the manufacturing processes. By vacuum forming the film over the bricks to form the custom brick film tray 200 the vacuum formed film assumes a corresponding shape to the unique contours in the bricks 102. The surfaces defining the brick shaped tray recesses 202 tightly engage around these unique brick surfaces to form a sealing engagement around the plurality of bricks 102. As previously described, where the surfaces defining the brick shaped tray recesses 202 tightly seal around the plurality of bricks 102, the resulting seal substantially isolates the decorative surfaces of the plurality of bricks and prevents bleed-by of liquid setting materials such as concrete into the custom brick film tray 200 and on to the decorative surfaces of the plurality of bricks 102.

In another example, vacuum forming the film 1000 includes molding grout ridges such as grout ridges 204 shown in FIG. 2 between the plurality of bricks 102 and the brick tray recesses 202 of the tray 200. The grout ridges 204 connect the brick shaped recesses 202 and provide a specified spacing between the recesses 202 and the bricks 102. The grout ridges 204 include grout recesses 206 on a surface facing in the same direction as the decorative brick surfaces 400. For instance, referring to FIG. 11B the decorative brick surfaces 400 are shown disposed within the brick shaped trays recesses 202 of the custom brick film tray 200. The decorative surfaces 400 are directed in the same direction as the surfaces defining the grout recesses 206. Correspondingly, the grout ridges 204 are directed in the same direction as the rear brick surfaces 406.

Optionally, the method 2400 further includes coupling a support grid such as support grid 1500, 1600 or a composite support including the support grids 1500 and 1600 within the grout recesses 206 of the custom brick film tray 200. In one option, coupling the support grid 1600 within the grout recesses 206 includes pouring a setting material within the grout recesses 206 to form the support grid. For example, a plaster or a liquid setting material is poured into the grout recesses that hardens and is breakable from the custom brick film tray 200 during peeling of the tray off of a brick façade wall. As previously described, the support grid 1600 with the support grid members 1602 positioned within the grout recess 206 provides structural support to the portions of the custom brick film tray 200 including the grout ridges 204. The liquid setting material such as concrete, cement and the like poured over the custom brick film tray 200 during construction of the brick façade wall 100 is supported by the grid support member 1602 to substantially prevent failure of the tray surfaces such as the grout ridges 204 due to the weight of the liquid setting material.

In yet another example, vacuum forming the film 1000 over the plurality of bricks 102 includes forming drafted perimeter surfaces of the brick shaped tray recesses such as tray recesses 1302 shown in FIGS. 13A-C. As shown in FIGS. 13A-C the drafted perimeter surfaces 1304 define the brick shaped tray recess 1302 and include a positive draft angle. The width of the brick shaped tray recess 1302 increases from a trough surface 1308 of the brick shaped tray recess toward an upper surface 1306 corresponding to a grout ridge such as grout ridge 204. As described above, the provision of the positive draft angle to the brick shaped tray recess creates a gentle slope in the tray and allows for easy removal of the custom brick film tray 200 from the plurality of bricks 102 during removal from the brick façade wall 100 (e.g., peeling of the custom brick tray from the brick façade wall).

In another example, vacuum forming the film 1000 over the plurality of bricks includes forming drafted perimeter surfaces of the brick shaped tray recesses such as brick shaped tray recesses 1202 shown in FIG. 12A. As shown in FIG. 12A the drafted perimeter surfaces 1207 of the brick shaped tray recess 1202 have a negative draft angle and the width of the brick shaped tray recess 1202 decreases from a tray lower surface (e.g., at a trough of the brick shaped tray recess) to the tray upper surface corresponding to the grout ridges 204 shown in FIG. 202. Where the brick shaped tray recesses include the negative draft angle removing the custom brick film tray such as custom brick film tray 1201 shown in FIG. 12A includes the drafted perimeter surfaces 1207 of the brick shaped tray recess 1202 engaged around the plurality of bricks 1200 to retain the bricks within the custom brick film tray 1201 during removal of the tray from the vacuum forming plate 500. As shown in the example in FIG. 12A, the brick 1200 includes a negatively drafted surface 1207, and when the film 1000 is vacuum molded over the brick 1207 the brick shaped tray recess 1202 assumes a corresponding negatively drafted shape. This interfitting cooperation of the surfaces of the brick shaped tray recess 1202 with the corresponding negatively drafted surfaces of the brick 1200 allows for the custom brick film tray 1201 to grasp the brick 1200 during removal from the vacuum forming plate 500.

In yet another example, vacuum forming the film 1000 over the plurality of bricks such as bricks 1800 includes forming drafted perimeter surfaces 1907 in a custom brick film tray 1900. The drafted perimeter surfaces 1907 are included in the brick shaped tray recesses 1903 as shown in FIG. 19. The drafted perimeter surfaces 1907 extend between a tray upper surface corresponding to the grout ridges 1902 and a tray lower surface 1905 corresponding to the trough or the surfaces of the custom brick film tray adjacent to the decorative brick surfaces 1806 of the plurality of bricks 1800. Forming the film 1000 over the bricks with the drafted perimeter surfaces 1907 includes forming a first tray perimeter surface having a positive draft angle, for instance, tray surfaces disposed along the positive draft surface 1801 of the brick 1800 and forming a second opposed tray perimeter surface having a negative draft angle corresponding to the negatively drafted surface 1803 of the brick 1800. As shown in FIG. 20, providing the plurality of bricks 1800 with the positively drafted and negatively drafted surfaces 1801, 1803 allows for corresponding formation of drafted surfaces in the custom brick film tray 1900 by molding around the bricks. Custom brick tray 1900 is thereafter used in a similar manner to custom brick film tray 200. Liquid setting material is poured over the plurality of bricks 1800 within the tray 1900 to form a brick façade wall 2000 having the plurality of bricks with the positive draft surfaces 1801 sloped away from the wall 2000. Liquid incident against the brick façade wall 2000 such as rain is thereby directed along the positive drafted services 1801 away from the wall exterior surface 2004 substantially preventing pooling of water within the bricks and thereby minimizing the chance of water freezing along the bricks and causing damage to the brick façade wall 2000.

In still another example, the method 2400 for forming the brick façade positioning assembly includes vacuum forming the film 1000 over the brick 1210 shown in FIG. 12C. The brick includes barbs 1212 extending from surfaces adjacent to the decorative brick surfaces such as decorative brick surfaces 400 shown in FIG. 4A for the brick 102. Vacuum forming of the film 1000 to form the custom brick film tray 1205 over the brick 1210 (or a plurality of bricks 1210) having the barbs 1212 forms corresponding barb recesses 1214 in the surfaces defining the brick shaped tray recess 1216 of the tray. Because the film 1000 is molded around the barbs 1212 of the brick 1210 the brick is anchored within the brick shaped tray recess 1216 during the vacuum forming process. Removal of the custom brick film tray 1205 from the vacuum forming plate 500 thereby pulls the plurality of bricks 1210 off the plate as the barbs 1212 are retained within the barb shaped recesses 1214 of the brick shaped tray recess 1216.

Optionally, the method 2400 includes pouring liquid setting materials, such as liquid setting material 1400 shown in FIG. 14A, over the plurality of bricks 102 and the custom brick film tray 200. The liquid setting material hardens into a brick façade wall (e.g., brick façade wall 200 shown in FIG. 14B and FIG. 1). Because the custom brick film tray 200 is molded around the plurality of bricks 102 in the specified wall pattern, the bricks are correspondingly disposed within the brick façade wall 100 in the specified wall pattern. Method 2400 further includes, in another example, peeling the custom brick film tray 200 from the brick façade wall 100 to expose the decorative brick surfaces 400 in the specified wall pattern (see FIGS. 14D, 14E). In yet another example, the method 2400 further includes storing the brick facade wall 100 with the custom brick film tray 200 retained over the plurality of bricks 102. Storage of the brick façade wall 100 with the tray 200 disposed over the plurality of the bricks 102 substantially protects the brick façade wall and the plurality of bricks 102 from exposure to the elements, moisture build up, impacts with other objects and the like.

In another option, the method 2400 includes coupling a plurality of custom brick film trays such as brick film trays 2300, 2302 shown in FIGS. 23A through 23C to form a composite custom brick film tray assembly 2303 prior to pouring of a liquid setting material, such as liquid setting material 1400. Coupling of the brick film trays 2300, 2302 into the assembly 2303 allows for the construction of a composite assembly 2303 having any desired dimensions as needed for a specified size of a brick façade wall. In yet another option, vacuum forming the film, such as film 1000, over the plurality of bricks 102 includes vacuum forming the film over a portion of the vacuum forming plate having a contoured decorative pattern as shown for example in FIG. 21 where the vacuum forming plate 2100 includes a contoured vacuum plate surface 2102. As shown in FIGS. 22A, 22B, the custom brick film tray 2200 includes a contoured tray surface 2202 corresponding to the contoured vacuum plate surface 2102. Provision of this decorative contoured surface 2202 in the custom brick film tray 2200 allows for the construction of a corresponding brick façade wall having an identical decorative contouring surface in a portion of the wall, for instance along the grout lines 110 (See FIG. 1).

Figure 25:
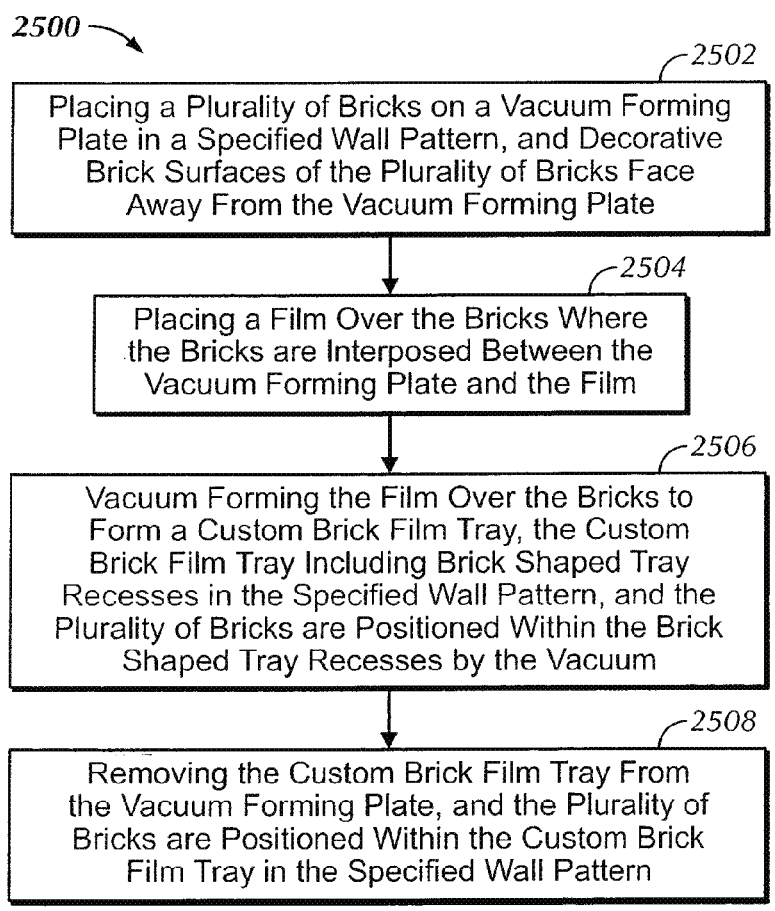
FIG. 25 is a block diagram showing another example of a method for forming a brick façade positioning assembly.

Another method 2500 for forming a brick façade positioning assembly such as custom brick film trays 200, 1100 (FIGS. 2 and 11Ci, 11Cii) is shown in FIG. 25. Method 2500 is not limited to the custom brick film tray 200 its related components and where applicable is intended to include any of the other custom brick film trays and components previously described. At 2502, a plurality of bricks 102 are positioned on a vacuum forming plate such as vacuum forming plate 500, 900 in a specified wall pattern. For example, the specified wall pattern can be any pattern of the plurality of bricks 102 intended to provide an aesthetically pleasing brick façade to a wall, such as brick façade wall 100. Decorative brick surfaces such as brick surfaces 400 shown in FIG. 4A face away from the vacuum forming plate 500, 900. The decorative brick surfaces are positioned relative to the vacuum forming plate to conceal the decorative brick surfaces within the custom brick film tray when the composite film is vacuum formed over the plurality of bricks 102. In one example, placing the plurality of bricks on the vacuum forming plate 500 includes positioning the plurality of bricks 102 within brick shaped plate recesses 506. In another example, placing the plurality of bricks 102 on the vacuum forming plate 900 includes positioning the bricks on the vacuum forming plate 900 having a planar vacuum plate surface 902. The bricks positioned on the planar vacuum plate surface 902 are arranged on the surface in the specified wall pattern. Referring to FIG. 9B, in another example, a wall pattern grid 906 is positioned on the vacuum forming plate 900. The plurality of bricks 102 are positioned in brick shaped grid recesses 908 to position the plurality of bricks in a specified wall pattern according to the configuration of the wall pattern grid 906.

At 2504, a film (e.g., film 1000) is positioned over the plurality of bricks where the plurality of bricks 102 are interposed between the vacuum forming plates and the film 1000. At 2506, the film 1000 is vacuum formed over the bricks 102 to form a custom brick film tray (e.g., custom brick film tray 200, 1100). Vacuum forming the film over the plurality of bricks 102 automatically positions the plurality of bricks 102 within brick shaped tray recesses that are molded around the plurality of bricks in the specified wall pattern. That is to say, molding the custom brick film tray 200, 1100 around the plurality of bricks 102 forms the tray into the specified wall pattern. The plurality of bricks 102 are arranged in the tray and thereby retained in the specified wall pattern after removal of the custom brick film tray from the vacuum forming plate. Referring to FIGS. 11B, 11Ci and 11Cii, the decorative brick surfaces 400 are concealed within the brick shaped tray recesses 202, 1102. At 2508, the custom brick film tray 200, 1100 is removed from the vacuum forming plate 500, 900. The plurality of bricks are positioned within the custom brick film trays 200, 1100 in the specified wall pattern according to the vacuum forming process performed in step 2506.

One example of the method 2500 further includes coupling a retaining feature on exposed rear brick surfaces 406 of the plurality of bricks 102. Optionally, the retaining feature is coupled with the rear brick surfaces 406 while the plurality of bricks 102 are within the custom brick film tray 1100 as shown in FIGS. 11Ci, 11Cii. In yet another option, the retaining feature on the exposed brick surfaces 406 includes an adhesive, such as adhesive 1106 shown in FIG. 11Cii and previously described above.

Figure 26:
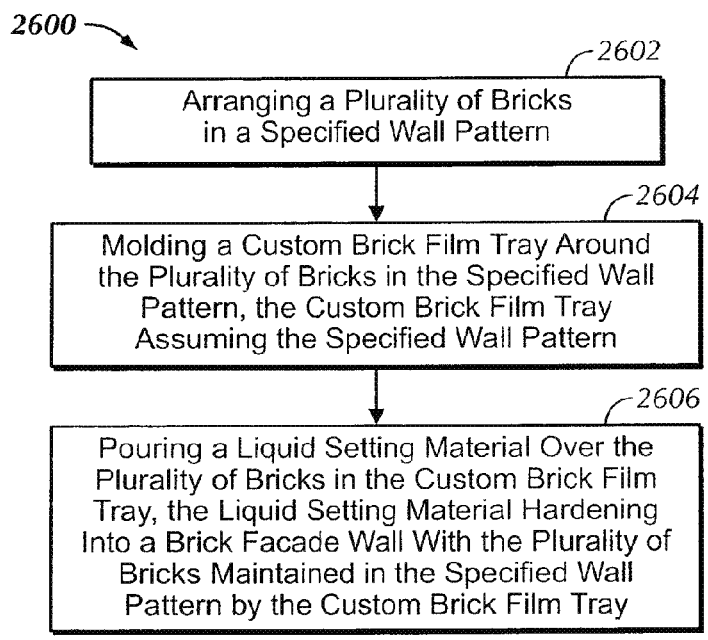
FIG. 26 is a block diagram showing one example of a method for making a brick façade wall.

FIG. 26 shows a method 2600 for making a wall, such as the brick façade wall 100 shown in FIG. 1. Reference is made to components previously described, and where a specific component is recited the method is not so limited and should be considered to include other features and components that similarly correspond to the feature mentioned. At 2602, the plurality of bricks such as the bricks 102 are arranged in a specified wall pattern. For instance, the plurality of bricks 102 are positioned within brick shaped plate recesses 506 of a vacuum forming plate such as vacuum forming plate 508 as shown in FIG. 5B. In another example and as previously described, the plurality of bricks 102 are positioned on a planar vacuum forming plate such as vacuum forming plate 900 shown in FIG. 9A.

At 2604, a custom brick film tray such as custom brick film tray 200 is molded around the plurality of bricks 102 in the specified wall pattern. Custom brick film tray 200 assumes the specified wall pattern as shown in FIGS. 10 through 11B. Optionally, molding the custom brick film tray 200 around the plurality of bricks 102 includes at least one of vacuum molding, injection molding or spray casting the custom brick film tray over the plurality of bricks 102.

As the film 1000 is molded over the plurality of bricks 102 the decorative bricks surfaces, such as surfaces 400 shown in FIG. 4A, are concealed by the custom brick film tray 200 within the brick shaped tray recesses 202. Concealing the decorative brick surfaces 400 within the brick shaped tray recesses protects the decorative brick surfaces 400 during storage and transport of the custom brick shaped tray 200 prior to its assembly into the brick façade wall 100. In one example, molding the custom brick film tray 200 includes molding the custom brick film tray 200 over only side portions of the sides of the plurality of brick. For example, referring to FIGS. 4A, 4B and FIG. 11B, the side portions 402 of the brick sides 212 are concealed by the molded portions of the custom brick film tray 200 including the perimeter surfaces defining the brick shaped tray recesses 202. The remainder of the sides, for example, the remainder portion 214 shown in FIG. 2, extends out of the custom brick film tray 200. Further, the rear brick surfaces 406 of the plurality of bricks are exposed out of the custom brick film tray. It is these exposed surfaces (214, 406) that are received within the brick façade wall 100.

At 2604, liquid setting material is are poured over the plurality of bricks 102 in the custom brick film tray 200. The liquid setting material 1400 hardens into, for instance, the brick façade wall 100 shown in FIG. 1. The plurality of bricks 102 are maintained in the specified wall pattern by the custom brick film tray 200 molded around the plurality of bricks 102 when the plurality of bricks were positioned in the specified wall pattern on the vacuum forming plate (see FIGS. 5A, 5B). The rear brick surfaces 406 and the remainder 214 of the brick sides 212 are disposed within the hardened liquid setting material while the decorative brick surfaces 400 and the side portions 402 extend out of the hardened liquid setting material.

Several options for the method 2600 follow. In one example, the method 2600 includes peeling the custom brick film tray 200 from the brick façade wall 100 to exposed the decorative brick surfaces 400 and side portions 402 in the specified wall pattern. In another example, molding the custom brick film tray 200 around the plurality of bricks 102 includes molding grout ridges such as grout ridges 204 shown in FIGS. 2 and 3 between the brick shaped tray recesses 202. Grout ridges 204 include grout recesses 206 shown in FIG. 2 and FIG. 11B. The grout recesses 206 face an opposed direction to the rear brick surfaces 406 as shown in FIG. 11B.

In one option, the method 2600 further includes coupling a support grid (e.g., support grids 1500, 1600 as shown in FIGS. 15 and 16) with the custom brick film tray 200. Optionally, coupling the support grid with the custom brick film tray 200 includes pouring a support grid setting material within portions of the custom brick film tray including the grout recesses 206 (see FIG. 16) to form the support grid. Optionally, the grid support 1600 includes grid support members 1602 constructed of wood, composites, metal and the like positioned within the grout recesses as described above. Positioning of the grid 1600 with the grid support members 1602 within the grout recesses 206 provides support to the grout ridges 204 while a liquid setting material is poured over the custom brick film tray 200. Provision of the support grid substantially prevents fracture of the custom brick film tray 200 at the grout ridges 204 and maintains the consistent uniform grout ridges within the brick façade wall 100 as shown in FIG. 1.

In another example, molding the custom brick film tray 200 around the plurality of bricks 102 in the specified wall pattern where the custom brick film tray 200 assumes the specified wall pattern includes identically molding the perimeter surfaces of the brick shaped tray recesses to the corresponding side portions of the plurality of bricks. The plurality of bricks 102, in one example, include unique contoured surfaces that are formed within the bricks during the brick manufacturing process (e.g., by inconsistencies in the manufacturing process, intentional molding of contours into the bricks and the like). Molding the film 1000 into the custom brick film tray 200 forces the film 1000 to assume a corresponding geometry to these contoured surfaces of the bricks 102. Because the custom brick film tray 200 molds around these non-identical contoured surfaces the perimeter surfaces of the brick shaped tray recesses assume a similar geometry and seal around the plurality of bricks 102. Sealing of the custom brick film tray 200 around the plurality of bricks 102 isolates the side portions 402 of the bricks 102 from the liquid setting material (e.g., liquid setting material 1400). The liquid setting material is thereby substantially prevented from infiltrating over the side portions of the plurality of bricks and covering any of the decorative surfaces of the bricks (400, 402).

In yet another example, the method 2600 includes forming retaining features in the brick shaped tray recesses 202 selected from the group consisting of friction surfaces 1204 on the brick 1206, adhesives 1220, barbs 1212, negative drafted perimeter surfaces 1207 as shown in FIG. 12A, composite negative and positive drafted perimeter surfaces 1803, 1801 (FIGS. 18-20), and the like. Method 2600 further includes retaining the plurality of bricks 102 as well as the bricks shown in FIGS. 12A-D and 18-20 within the brick shaped tray recesses with the retaining features.

In still another example, method 2600 further includes positioning the custom brick film tray 200 with the plurality of bricks 102 in the specified wall pattern within a setting form with the decorative brick surfaces 400 of the plurality of bricks facing outward from the form. The liquid setting material, such as liquid setting material 1400, is poured into the form to form the brick façade wall 100. In one option, positioning the custom brick film tray 200 within the setting form includes positioning the custom brick film tray with the plurality of bricks within a vertical setting form, for example vertical setting form 1700, shown in FIG. 17.

In another option, molding the custom brick film tray 200 over only side portions 402 of the plurality of bricks 102 includes molding drafted perimeter surfaces 1907 into the tray 200 within brick shaped tray recesses 1903. A first positive drafted perimeter surface of the brick shaped tray recesses 1903 corresponds to the positive drafted surfaces 1801 of the brick 1800 shown in FIG. 18. A second negative drafted perimeter surface of the brick shaped tray recesses 1903 corresponds to the negative drafted perimeter surfaces 1803. The method 2600 further includes arranging the plurality of bricks 1800 in the specified wall pattern including positioning the first positive drafted perimeter surfaces 1801 of the plurality of bricks 1800 to face in a first direction (e.g., relatively upward along a wall surface) and directing the second negative drafted perimeter surfaces 1803 to face in a second direction opposed to the first direction (e.g., downward along the wall toward the wall base). In yet another example, pouring the liquid setting material 1400 over the plurality of bricks 1800 in the custom brick film tray, such as custom brick film tray 1900 shown in FIG. 19, includes facing the positively drafted perimeter surfaces 1801 in the first direction along the brick façade wall and facing the second negative drafted perimeter surfaces in the second direction on the brick façade wall. Where the first direction, in one example, is relatively upward along the wall and the second direction is relatively downward toward the base of the wall.

Figure 27:
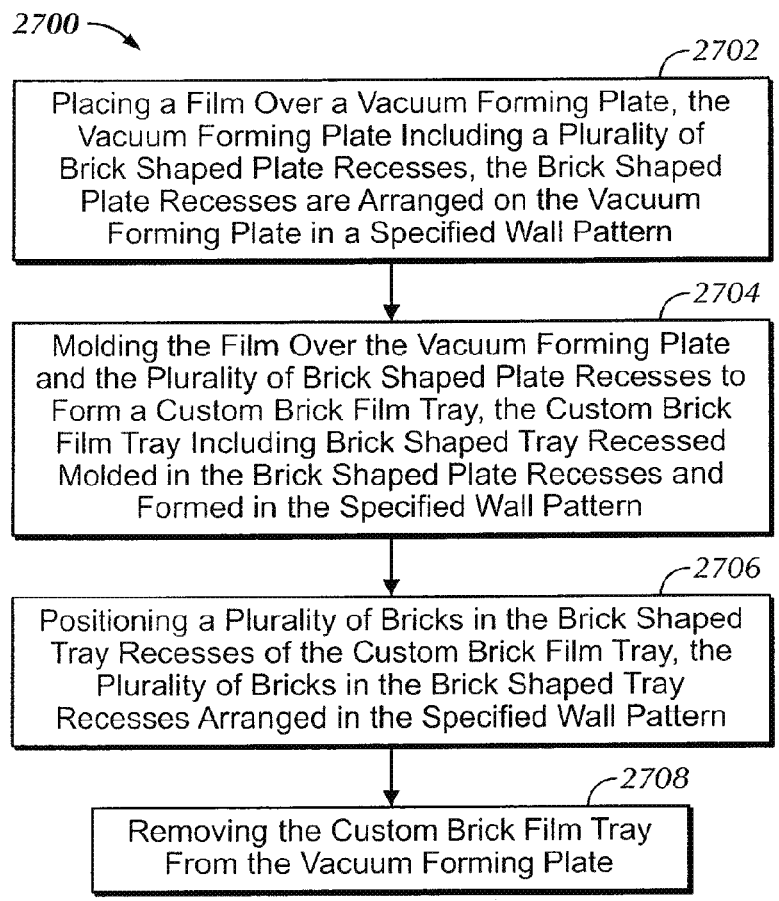
FIG. 27 is a block diagram showing one example of a method for forming a brick façade positioning assembly without a plurality of bricks.

Another example of a method 2700 for forming a brick façade positioning assembly is shown in FIG. 27. Method 2700 is not limited to the custom brick film tray 200 and its related components, and where applicable is intended to include any of the other custom brick film trays and components previously described. At 2702, a film, such as the film 1000 shown in FIG. 10, is placed over a vacuum forming plate (e.g., vacuum forming plate 500, 508). The vacuum forming plate 500 includes a plurality of brick shaped plate recesses 506. The brick shaped plate recesses 506 are arranged in the vacuum forming plate along the vacuum plate surface 502 in a specified wall pattern corresponding to a desired brick pattern in a finished brick façade wall, for instance brick façade wall 100 shown in FIG. 1. As previously described, the vacuum forming plate 500 is configured, in one example, to couple with a plurality of vacuum plate surfaces 502 having brick shaped plate recesses arranged in a variety of specified wall patterns. The brick shaped plate recesses in the various specified wall patterns are configured to achieve a desired aesthetic appearance for a brick façade wall formed with the custom brick film tray formed therefrom.

At 2704, the film 1000 is molded over the vacuum forming plate and the plurality of brick shaped plate recesses 506 to form a custom brick film tray, such as custom brick film tray 200 shown in FIGS. 2 and 3. The custom film tray 200 includes brick shaped tray recesses 202 molded in the brick shaped plate recesses 506 and thereby formed in the specified wall pattern. In other words, the film 1000 is vacuum formed into the brick shaped plate recesses 506 to form the brick shaped tray recesses 202 arranged in the specified wall pattern on the custom brick film tray 200.

At 2706, a plurality of bricks such as bricks 102 are positioned within the brick shaped tray recesses 202 of the custom brick film tray 200. Positioning of the plurality of bricks 102 within the brick shaped tray recesses 202 arranges the bricks in the specified wall pattern originally formed in the vacuum forming plate 500 by the brick shaped plate recesses 506. As described above, the brick shaped plate recesses 506 are spaced from each other according to spaces 514 shown in FIG. 5A, in one example. Spaces 514 correspondingly define grout ridges 204 in the custom brick film tray 200 molded over the vacuum forming plate 500. Spacing (e.g., grout ridge dimensions) between the plurality of bricks 102 within the brick shaped tray recesses 202 of the tray 200 is thereby determined by the spacing 514 on the vacuum plate surface 502.

At 2708, the method 2700 includes removing the custom brick film tray 200 from the vacuum forming plate 500. In one example, the method 2700 includes positioning the plurality of bricks 102 in the brick shaped tray recesses 202 before the custom brick film tray 200 is removed from the vacuum forming plate 500. In another example, the method 2700 includes positioning the plurality of bricks in the brick shaped tray recesses 202 of the custom brick film tray 200 after removing the custom brick film tray 200 from vacuum forming plate 500. That is to say, the plurality of bricks 102 are positionable within the custom brick film tray 200 after the tray 200 is formed on the vacuum forming plate but before its removal, or in the other example where the custom brick film tray 200 has been removed from the vacuum forming plate 500 and thereafter receives the bricks 102. For instance, the custom brick film trays 200 without the plurality of bricks 102 therein are stored until needed and the plurality of bricks 102 are then positioned within the custom brick film trays 200 loaded on a pallet and shipped to a work site or another manufacturing site for construction of the brick façade wall.

CONCLUSION

The above described methods and custom brick shaped trays and associated components provide an efficient inexpensive way to form brick façade walls. The custom brick film trays are formed with polymer films that are molded around the plurality of bricks allowing for immediate pouring of a liquid setting material on the trays and bricks therein to form a brick façade wall. Because the plurality of bricks are arranged in a desired specified wall pattern, the polymer film assumes a corresponding wall pattern with the brick shaped tray recesses as the film is molded over the bricks. The custom brick film tray maintains the arrangement of the plurality of bricks in the specified wall pattern during pouring of a liquid setting material to construct the brick façade wall. The custom brick film tray is formed away from a work site (e.g., at a factory) and maintains the bricks in the specified wall pattern for immediate pouring of the liquid setting material either at a work site or some other location, such as a factory, warehouse and the like. The users of the custom brick film tray and the methods for making the same do not need to separately make the tray and then position a plurality of bricks in the tray. In other words, by pre-forming the custom brick shaped tray around the plurality of bricks labor is minimized at a work site because the tray with the bricks therein may immediately receive liquid setting material (e.g., after removal from a delivered pallet). That is to say, the tray is molded around the plurality of bricks in the specified wall pattern in a single step, and the tray with the bricks may be transported to a work site for immediate use (e.g., pouring of a liquid setting material on the tray to form the brick façade wall) as opposed to labor intensive individual placement of individual bricks in an existing mat at a work site. Moreover, the custom brick shaped trays are formed with retaining features that retain the bricks within the molded tray after removal from the vacuum forming plate to further minimize labor.

As described above, at least one of the vacuum forming plates or wall pattern grid are configured for a desired wall pattern. The spacing between the brick shaped plate recesses and the recess distance of the plate recesses determines how the plurality of bricks will be positioned within the tray molded around the bricks as well as the appearance of the brick façade wall that is poured on the tray. Because the custom brick shaped tray is formed in the specified wall pattern, the spacing between the brick shaped tray recesses (and bricks)—the grout ridges—define the desired width of the wall grout lines. Similarly, adjustment of the recess distance in the plate determines how much of the bricks are received in the molded tray and correspondingly how much of the bricks are exposed in the brick façade wall. Optionally, the vacuum forming plate (or wall pattern grid) includes a contoured decorative surface. Because the custom brick film tray is molded over the contoured decorative surface, the tray as well as the wall formed on the tray will correspondingly carry this decorative surface.

Further, molding of the custom brick film tray around the plurality of bricks creates a tight seal around each of the bricks that substantially prevents bleed-by of liquid setting materials onto the decorative (and exposed) surfaces of the bricks in the brick façade wall. Each of the bricks includes unique surfaces whether from manufacturing inconsistencies, intentional formation of non-identical surfaces for aesthetic reasons and the like. As the polymer film is molded over the bricks having these unique surfaces the film correspondingly forms around the unique surfaces and takes on a corresponding shape in the surfaces defining the brick shaped tray recesses. The corresponding surfaces of the brick shaped tray recesses tightly engage around the unique surfaces of the plurality of bricks. This tight engagement seals the decorative surfaces of the bricks away from rear brick surfaces that are eventually received in the brick façade wall. As the liquid setting material is poured on the trays, the decorative brick surfaces are isolated from the liquid setting material by the seal between the tray and the bricks substantially preventing bleed-by of the liquid setting material. In other words, molding the custom brick shaped tray around the plurality of bricks, where the bricks include unique surfaces, forms custom brick shaped tray recesses with corresponding surfaces, and the corresponding surfaces tightly seal around each of the bricks.

Although the present invention has been described in reference to preferred embodiments, persons skilled in the art will recognize that changes may be made in form and detail without departing from the spirit and scope of the invention. For example, the custom brick film trays are formed with another method of molding including, but not limited to, spray casting, injection molding and the like. Additionally, although the plurality of bricks shown include consistently dimensioned bricks, bricks having irregular decorative shapes are positionable within recesses on vacuum forming plates or on planar vacuum forming plates to form corresponding custom brick film trays. For instance, irregular decorative bricks include bricks of varying sizes used in the same façade wall, bricks having different textures and shapes used in the same façade wall, such as decorative rocks, and the like. In one example, the vacuum forming plate includes recesses corresponding to the shapes of the irregular decorative bricks in a similar manner to the examples described herein (e.g., recesses and bricks in a specified wall pattern). In another example, the irregular shaped bricks are positioned on a planar vacuum forming plate with or without a wall pattern grid in a similar manner to the other examples described herein. The use of irregular decorative bricks is applicable to each of the claims and examples described herein.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A method for forming a brick facade positioning assembly comprising:
   placing a plurality of bricks within corresponding brick shaped plate recesses on a vacuum forming plate, the brick shaped plate recesses arranged on the vacuum forming plate in a specified wall pattern, wherein the plurality of bricks are positioned within the brick shaped plate recesses in the specified wall pattern with decorative brick surfaces facing away from the vacuum forming plate;
   placing a plastic film sheet over the bricks where the bricks are interposed between the vacuum forming plate and the plastic film sheet;
   vacuum forming the plastic film sheet over the bricks to form a custom brick film tray, the custom brick film tray including brick shaped tray recesses in the specified wall pattern, and the plurality of bricks are positioned within the brick shaped tray recesses by the vacuum forming, wherein the decorative brick surfaces are concealed within the brick shaped tray recesses, and vacuum forming includes forming drafted perimeter surfaces of the brick shaped tray recesses between a tray upper surface and a tray lower surface, wherein the tray lower surface is within the brick shaped tray recesses, and a first tray perimeter surface includes a positive draft angle and a second opposed tray perimeter surface includes a negative draft angle, wherein each of the bricks include corresponding drafted sides; and removing the custom brick film tray from the vacuum forming plate, and the plurality of bricks are positioned within the custom brick film tray in the specified wall pattern.

2. The method for forming the brick façade positioning assembly of claim 1, wherein vacuum forming the plastic film sheet over the bricks to form the custom brick film tray includes custom forming each brick shaped tray recess according to the unique shapes and surfaces of the individual bricks within each brick shaped tray recess.

3. The method for forming the brick façade positioning assembly of claim 1, wherein vacuum forming the plastic film sheet includes molding grout ridges between the bricks, the grout ridges connecting the brick shaped tray recesses, and the grout ridges include grout recesses on a surface facing in the same direction as the decorative brick surfaces.

4. The method for forming the brick façade positioning assembly of claim 3 further comprising coupling a support grid within the grout recesses.

5. The method for forming the brick façade positioning assembly of claim 4, wherein coupling the support grid within the grout recesses includes pouring a setting material within the grout recesses to form the support grid.

6. The method for forming the brick façade positioning assembly of claim 1, wherein vacuum forming the plastic film sheet over the bricks includes forming drafted perimeter surfaces of the brick shaped tray recesses between a tray upper surface and a tray lower surface, wherein the tray lower surface is within the brick shaped tray recesses, and a width of the brick shaped tray recesses increases from the tray lower surface to the tray upper surface.

7. The method for forming the brick façade positioning assembly of claim 1, wherein vacuum forming the plastic film sheet over the bricks includes forming drafted perimeter surfaces of the brick shaped tray recesses between a tray upper surface and a tray lower surface, wherein the tray lower surface is within the brick shaped tray recesses, and a width of the brick shaped tray recesses decreases from the tray lower surface to the tray upper surface.

8. The method for forming the brick façade positioning assembly of claim 7, wherein removing the custom brick film tray from the vacuum forming plate includes the drafted perimeter surfaces clamping around the plurality of bricks to retain the bricks within the custom brick film tray during removal of the custom brick film tray from the vacuum forming plate.

9. The method for forming the brick façade positioning assembly of claim 1, wherein vacuum forming the plastic film sheet over the bricks includes forming barbed recesses over corresponding barbs, the barbed recesses are along perimeter surfaces of the brick shaped tray recesses, and the barbed recesses receive the corresponding barbs extending from the plurality of bricks to retain the plurality of bricks within the custom brick film tray.

10. The method for forming the brick façade positioning assembly of claim 1 further comprising:

pouring a liquid setting material over the plurality of bricks and the custom brick film tray, the liquid setting material hardening into a brick façade wall with the plurality of bricks in the specified wall pattern; and peeling the custom brick film tray from the brick façade wall to expose the decorative brick surfaces in the specified wall pattern.

11. The method for forming the brick façade positioning assembly of claim 10 further comprising storing the brick façade wall with the custom brick film tray retained over the plurality of bricks.

12. The method for forming the brick façade positioning assembly of claim 10 further comprising coupling the custom brick film tray with at least one other custom brick film tray to form a composite custom brick film tray prior to pouring the liquid setting material.

13. The method for forming the brick façade positioning assembly of claim 1, wherein vacuum forming the plastic film sheet over the bricks includes vacuum forming the plastic film sheet over a portion of the vacuum forming plate having a contoured decorative pattern, and the contoured decorative pattern is formed in the custom brick film tray.

14. A method of making a wall comprising:
arranging a plurality of bricks in a specified wall pattern;
molding a custom brick film tray comprising a plastic film sheet around the plurality of bricks in the specified wall pattern, the custom brick film tray assuming the specified wall pattern, and decorative brick surfaces are concealed by the custom brick film tray, molding the custom brick film tray including:
concealing decorative brick exterior surfaces of the plurality of bricks within brick shaped tray recesses,
molding the custom brick film tray comprising the plastic film sheet over only side portions of the sides of the plurality of bricks, the remainder of the sides extend out of the custom brick film tray, and rear brick exterior surfaces are exposed out of the custom brick film tray;
molding including forming drafted perimeter surfaces of the brick shaped tray recesses between a tray upper surface and a tray lower surface, wherein the tray lower surface is within the brick shaped tray recesses, and a first tray perimeter surface includes a positive draft angle and a second opposed tray perimeter surface includes a negative draft angle, wherein each of the bricks include corresponding drafted sides; and
pouring a liquid setting material over the plurality of bricks in the custom brick film tray, the liquid setting material hardening into a brick façade wall with the plurality of bricks maintained in the specified wall pattern by the custom brick film tray, and the rear brick exterior surface and the remainder of the sides are disposed within the hardened liquid setting material while the decorative brick exterior surface and the side portions extend out of the hardened liquid setting material.

15. The method of making the brick façade wall of claim 14 further comprising peeling the custom brick film tray from the brick façade wall to expose the decorative brick surfaces and side portions in the specified wall pattern.

16. The method of making the brick façade wall of claim 14, wherein molding the custom brick film tray comprising the plastic film sheet around the plurality of bricks includes molding grout ridges between the brick shaped tray recesses, the grout ridges including grout recesses facing in an opposed direction to the rear brick surfaces of the plurality of bricks.

17. The method of making the brick façade wall of claim 16 further comprising coupling a support grid with the custom brick film tray.

18. The method making the brick façade wall of claim 17, wherein coupling the support grid with the custom brick film tray includes pouring a support grid setting material within portions of the custom brick film tray.

19. The method of making the brick façade wall of claim 17, wherein coupling the support grid with the custom brick film tray includes coupling the support grid within the grout recesses.

20. The method of making the brick façade wall of claim 19, wherein pouring the liquid setting material over the plurality of bricks in the custom brick film tray includes pouring the liquid setting material over the grout ridges, and the grout ridges are supported by the support grid positioned within the grout recesses.

21. The method of making the brick façade wall of claim 14, wherein molding a custom brick film tray comprising the plastic film sheet around the plurality of bricks in the specified wall pattern, the custom brick film tray assuming the specified wall pattern includes identically molding the perimeter surfaces of the brick shaped tray recesses to the corresponding side portions of the plurality of bricks.

22. The method of making the brick façade wall of claim 21, wherein identically molding the perimeter surfaces and trough surfaces of the brick shaped tray recesses includes sealing the perimeter surfaces of the brick shaped tray recesses around the plurality of bricks.

23. The method of making the brick façade wall of claim 22, wherein pouring the liquid setting material over the plurality of bricks in the custom brick film tray includes isolating the side portions of the plurality of bricks from the liquid setting material with the perimeter surfaces of the brick shaped tray recesses sealed around the plurality of bricks.

24. The method of making the brick façade wall of claim 14 further comprising forming retaining features in the brick shaped tray recesses selected from the group consisting of: friction surfaces, adhesives, barbs, negatively drafted perimeter surfaces, composite negative and positive drafted perimeter surfaces, and
retaining the plurality of bricks within the brick shaped tray recesses with the retaining features.

25. The method of making the brick façade wall of claim 14 further comprising positioning the custom brick film tray with the plurality of bricks in the specified wall pattern within a setting form with the decorative brick surfaces of the plurality of bricks facing outward from the form, and
pouring the liquid setting material over the plurality of bricks includes pouring the liquid setting material into the form.

26. The method of making the brick façade wall of claim 25 wherein positioning the custom brick film tray within the setting form includes positioning the custom brick film tray with the plurality of bricks within a vertical setting form.

27. The method of making the brick façade wall of claim 14, wherein molding the custom brick film tray over only side portions of the sides of the plurality of bricks includes:
molding first positive drafted perimeter surfaces of the brick shaped tray recesses, and
molding second negative drafted perimeter surfaces of the brick shaped tray recesses opposed to the first positive drafted perimeter surfaces, and the first positive and second negative drafted perimeter surfaces correspond to the side portions of each of the plurality of bricks having corresponding positive and negative drafts.

28. The method of making the brick façade wall of claim 27, wherein arranging the plurality of bricks in the specified wall pattern includes directing the first positive drafted perimeter surfaces of the plurality of bricks to face in a first direction and directing the second negative drafted perimeter surfaces to face in a second direction opposed to the first direction.

29. The method of making the brick façade wall of claim 28, wherein pouring the liquid setting material over the plurality of bricks in the custom brick film tray, the liquid setting material hardening into a brick façade wall includes facing the first positive drafted perimeter surfaces in the first direction along the brick façade wall and facing the second negative drafted perimeter surfaces in the second direction along the brick façade wall.

30. The method of making the brick façade wall of claim 14, wherein molding the custom brick film tray comprising the plastic film sheet around the plurality of bricks in the specified wall pattern consists of vacuum molding or spray casting the custom brick film tray comprising the plastic film sheet around the plurality of bricks in the specified wall pattern.

31. A method for forming a brick facade positioning assembly comprising:
placing a plurality of bricks on a vacuum forming plate in a specified wall pattern, and decorative brick surfaces of the plurality of bricks face away from the vacuum forming plate;
placing a plastic film sheet over the bricks where the bricks are interposed between the vacuum forming plate and the plastic film sheet;
vacuum forming the plastic film sheet over the bricks to form a custom brick film tray, the custom brick film tray including brick shaped tray recesses in the specified wall pattern, and the plurality of bricks are positioned within the brick shaped tray recesses by the vacuum forming, wherein the decorative brick surfaces are concealed within the brick shaped tray recesses, vacuum forming includes forming drafted perimeter surfaces of the brick shaped tray recesses between a tray upper surface and a tray lower surface, wherein the tray lower surface is within the brick shaped tray recesses, and a first tray perimeter surface includes a positive draft angle and a second opposed tray perimeter surface includes a negative draft angle, wherein each of the bricks include corresponding drafted sides; and
removing the custom brick film tray from the vacuum forming plate, and the plurality of bricks are positioned within the custom brick film tray in the specified wall pattern.

32. The method for forming the brick facade positioning assembly of claim 31 further comprising placing a wall pattern grid on the vacuum forming plate, and
placing the plurality of bricks on the vacuum forming plate includes positioning the plurality of bricks within brick shaped grid recesses in the wall pattern grid.

33. The method for forming the brick facade positioning assembly of claim 31 further comprising coupling a retaining feature on exposed rear brick surfaces of the plurality of bricks within the custom brick film tray.

34. The method for forming the brick facade positioning assembly of claim 33 wherein coupling the retaining feature on the exposed rear brick surfaces includes applying an adhesive to the exposed rear brick surfaces.

35. The method for forming the brick façade positioning assembly of claim 31, wherein vacuum forming the plastic film sheet over the bricks to form the custom brick film tray includes custom forming each brick shaped tray recess according to the unique shapes and surfaces of the individual bricks within each brick shaped tray recess.

36. The method for forming the brick façade positioning assembly of claim 35, wherein custom forming each brick shaped tray recess includes sealing the perimeter surfaces of the brick shaped tray recesses around the plurality of bricks.

37. The method for forming the brick façade positioning assembly of claim 31 comprising:

pouring a liquid setting material over the plurality of bricks and the custom brick film tray, the liquid setting material hardening into a brick façade wall with the plurality of bricks in the specified wall pattern; and peeling the custom brick film tray from the brick façade wall to expose the decorative brick surfaces in the specified wall pattern.

38. The method for forming the brick façade positioning assembly of claim 37, wherein pouring the liquid setting material over the plurality of bricks and the custom brick film tray includes isolating the side portions of the plurality of bricks from the liquid setting material with the perimeter surfaces of the brick shaped tray recesses custom formed and sealed around the plurality of bricks.

* * * * *